United States Patent
Warshaw

(10) Patent No.: US 12,149,491 B2
(45) Date of Patent: Nov. 19, 2024

(54) MESSAGING PLATFORM COMMUNICATION PROCESSING USING MESSAGE CLUSTER DETECTION AND CATEGORIZATION

(71) Applicant: RealNetworks LLC, Seattle, WA (US)

(72) Inventor: Randy Warshaw, New York, NY (US)

(73) Assignee: REALNETWORKS LLC, Seattle, WA (US)

( * ) Notice: Subject to any disclaimer, the term of this patent is extended or adjusted under 35 U.S.C. 154(b) by 0 days.

(21) Appl. No.: 17/561,436

(22) Filed: Dec. 23, 2021

(65) Prior Publication Data

US 2022/0116349 A1 Apr. 14, 2022

Related U.S. Application Data

(63) Continuation of application No. 16/767,071, filed as application No. PCT/US2018/062649 on Nov. 27, 2018, now Pat. No. 11,212,246.

(60) Provisional application No. 62/590,917, filed on Nov. 27, 2017.

(51) Int. Cl.
| | |
|---|---|
| *H04L 51/214* | (2022.01) |
| *H04L 51/18* | (2022.01) |
| *H04L 51/212* | (2022.01) |
| *H04L 51/42* | (2022.01) |
| *H04L 51/56* | (2022.01) |

(52) U.S. Cl.
CPC ............ *H04L 51/214* (2022.05); *H04L 51/18* (2013.01); *H04L 51/212* (2022.05); *H04L 51/42* (2022.05); *H04L 51/56* (2022.05)

(58) Field of Classification Search
CPC ....... H04L 51/214; H04L 51/42; H04L 51/56; H04L 51/212; H04L 51/18
See application file for complete search history.

(56) References Cited

U.S. PATENT DOCUMENTS

| | | |
|---|---|---|
| 8,738,721 B1 | 5/2014 | Smirnov et al. |
| 9,043,417 B1 | 5/2015 | Jones et al. |
| 9,047,619 B2 | 6/2015 | O'Malley et al. |

(Continued)

OTHER PUBLICATIONS

PCT/US2018/062649—International Search Report and Written Opinion, mailed Feb. 7, 2019, 17 pages.

(Continued)

*Primary Examiner* — Ryan J Jakovac
(74) *Attorney, Agent, or Firm* — Seed IP Law Group LLP

(57) ABSTRACT

Techniques are described herein for processing intra- and inter-messaging platform communications, including by receiving and analyzing messages originating from one sender for distribution to a recipient, where the sender and recipient may be on a same or separate messaging platform. Clusters of such messages with similar contents or other similar characteristics are identified and categorized, such as in accordance with configuration information regarding one or both of the originating and destination messaging platforms. Based on a determination of one or more categories associated with such an identified message cluster, as well as an analysis of metadata associated with the profile of the sender of the messages, various actions may be taken with respect to such message clusters or with parties associated with such message clusters, including actions based at least in part on the configuration information.

19 Claims, 22 Drawing Sheets

(56) References Cited

U.S. PATENT DOCUMENTS

| | | |
|---|---|---|
| 9,413,907 B2 | 8/2016 | Imai |
| 2005/0160148 A1 | 7/2005 | Yu |
| 2006/0015563 A1 | 1/2006 | Judge et al. |
| 2009/0157708 A1 | 6/2009 | Bandini et al. |
| 2010/0146057 A1 | 6/2010 | Abu-Hakima et al. |
| 2011/0119730 A1* | 5/2011 | Eldar .................. G06F 21/554 726/1 |
| 2012/0246725 A1* | 9/2012 | Osipkov ............. G06F 21/572 715/752 |
| 2013/0238728 A1 | 9/2013 | Fleck et al. |
| 2015/0081816 A1 | 3/2015 | Trevelyan |
| 2015/0195224 A1 | 7/2015 | Karnin et al. |
| 2017/0295143 A1 | 10/2017 | Bone et al. |
| 2018/0253659 A1* | 9/2018 | Lee ....................... H04L 51/42 |
| 2019/0044899 A1* | 2/2019 | Hughes ................ H04L 51/066 |

OTHER PUBLICATIONS

EP 18881312.5—Extended European Search Report, mailed Jul. 1, 2021, 9 pages.

\* cited by examiner

| | Owner ID | Message Class ID | Type | Max Rate (in MPM) | Carrier Vetting | Sender ID Required | Source ID Required | Shared | Intended Uses | Risk Rating |
|---|---|---|---|---|---|---|---|---|---|---|
| 325a | Carrier A | A | P2P | 15 | No | No | No | No | Peer to Peer | -1 |
| 325b | Carrier A | B | P2P | 15 | No | No | Yes | No | Promotional (authorized) | n/a |
| 325c | Carrier A | C | A2P | 50 | No | No | No | No | Two-Factor Authentication | -1 |
| 325d | Carrier A | D | M2M | 100 | Automated API | No | Yes | No | IoT Updates | -1 |
| 325e | Carrier A | E | A2P | 10,000 | Yes | Yes | Yes | Yes | Enterprise campaign | n/a |
| 325f | Carrier A | F | A2P | 100 | No | No | No | No | Account / Password confirmation | n/a |
| 325g | Carrier A | G | P2P | 50 | No | No | No | Yes | Customer Support | -1 |
| 325h | Carrier A | H | P2P | 5 | No | Yes | Yes | No | Promotional (unauth) | +3 |
| 325i | Carrier A | I | P2P | 0 | n/a | No | Yes | n/a | Phishing | +9 |

*Fig. 3B*

| Messages in Cluster | Senders in Cluster | Common Words | Sample Message | | Highest Volume Routes | | | | | | Classification |
|---|---|---|---|---|---|---|---|---|---|---|---|
| | | | | | Origin Network | Destination Network | Messages | Origin Network | Destination Network | Messages | |
| 733,781 | 8 | G, Google, Code, is, verification, your | G- is your Google verification code | | src_029 | dst_004 | 193,852 | | | | 2FA |
| | | | | | src_029 | dst_003 | 141,254 | | | | |
| | | | | | src_026 | dst_004 | 97,495 | | | | |
| | | | | | src_026 | dst_003 | 70,835 | | | | |
| | | | | | src_029 | dst_005 | 62,987 | | | | |
| 510,459 | 1,304 | <URL>, chat, go, gorgeous, happy, thursday, today, women | Happy Thursday! Chat with gorgeous women today. Go to https://example.example | | src_025 | dst_004 | 189,583 | | | | Spam |
| | | | | | src_028 | dst_004 | 99,054 | | | | |
| | | | | | src_030 | dst_004 | 89,994 | | | | |
| | | | | | src_030 | dst_001 | 44,928 | | | | |
| | | | | | src_030 | dst_006 | 26,403 | | | | |

*Fig. 4A*

Networks Originating Traffic — 438

| Origin Network | Total Messages | Clusters | Senders | | | | |
|---|---|---|---|---|---|---|---|
| src_028 | 823,781 | 2,119 | 14 | | | | |
| | | | | Top 5 Destination Routes by Volume | | | |
| | | | | Destination Network | Messages | Clusters | Senders |
| | | | | dst_004 | 791,485 | 1,943 | 12 |
| | | | | dst_003 | 31,932 | 680 | 10 |
| | | | | dst_006 | 249 | 37 | 2 |
| | | | | dst_001 | 118 | 18 | 3 |
| | | | | dst_007 | 102 | 20 | 5 |
| src_031 | 710,459 | 3,862 | 18 | | | | |
| | | | | Destination Network | Messages | Clusters | Senders |
| | | | | dst_003 | 471,832 | 2,654 | 10 |
| | | | | dst_004 | 106,304 | 1,189 | 14 |
| | | | | dst_007 | 92,543 | 1,543 | 15 |
| | | | | dst_006 | 29,112 | 984 | 13 |
| | | | | dst_001 | 15,043 | 611 | 12 |

| Senders | Messages | Origin Network | Clusters |
|---|---|---|---|
| bfe4fdbd593ca05494483... | 815,392 | src_028 | 1492 |
| 9743829364380f3829bfe... | 536,392 | src_029 | 1316 |
| bfe4fdbdf543904427de5... | 506,392 | src_031 | 3079 |
| bfe4fdbd5de4439274da2... | 321,458 | src_026 | 1332 |
| 97438238294832997be47f... | 268,594 | src_026 | 112 |
| bfe4fdbd53290220acad... | 197,392 | src_025 | 52 |
| bfe4fdbcaaae3495831f93... | 127,590 | src_030 | 1328 |
| e88436ad3820bd136bfd43... | 120,493 | src_030 | 15 |
| 974382a4f330d9390b-49a... | 117,392 | src_023 | 1108 |
| bfe4fdbd59382028330be... | 90,931 | src_031 | 585 |
| 881e83925edd3812f39d... | 73,953 | src_029 | 411 |
| 5e1254a281b9c3d34589... | 66,948 | src_031 | 991 |
| 5e1254a3939ac3925ba46... | 60,507 | src_029 | 1066 |
| d7f740de63927ba38f3e2... | 55,032 | src_030 | 50 |
| bfe4fdbd538291fa438290... | 45,963 | src_030 | 628 |

*Fig. 4H*

Risk Rating Thresholds

| Owner | Category | Threshold | Created By | Created | Modified | Modified By |
|---|---|---|---|---|---|---|
| Network 633c96de-8f3e-11e8-b86d-1652836369b1a8 | Suspect | 70 | anonymous | 08-28-2018 20:28:57 | | |
| Network 63f114cda-8f3e-11e8-b85d-1552b36369b1a8 | Spammer | 80 | anonymous | 08-28-2018 20:28:57 | | |
| Network 633bd642-8f3e-11e8-b86d-1652836369b1a8 | Suspect | 75 | anonymous | 08-28-2018 20:28:30 | | |
| Network 6449edea-8f3e-11e8-b86d-1652836369b1a8 | Spammer | 90 | anonymous | 08-28-2018 20:28:30 | | |
| Network 63f65fbc-8f3e-11e8-b86d-1652836369b1a8 | Spammer | 90 | script | 05-14-2018 19:30:54 | 05-21-2018 22:08:07 | ma_manager |
| Network 65746d4fa-8f3e-11e8-b86d-1652836369b1a8 | Suspect | 86 | script | 05-14-2018 19:30:54 | 05-17-2018 05:08:50 | ma_manager |

MESSAGING PLATFORM COMMUNICATION PROCESSING USING MESSAGE CLUSTER DETECTION AND CATEGORIZATION

TECHNICAL FIELD

The following disclosure relates generally to techniques for processing messages between messaging platforms, and in particular for identification and differentiated handling of messages having similar content or characteristics.

BACKGROUND

DESCRIPTION OF THE RELATED ART

The quantity of messages being sent within and between messaging platforms has risen steadily in the last several years, typically corresponding to a rise in a quantity of mobile device and other subscriber users, as well as a rise in the use of alternative types of such messages. For example, in addition to traditional user-to-user or peer-to-peer ("P2P") textual (e.g., SMS) or multimedia (e.g., MMS) messages, increasing quantities of application-to-person ("A2P"), and machine-to-machine ("M2M") messages are being transmitted within and between such messaging platforms. Moreover, despite numerous historical and ongoing attempts to identify and curtail non-authorized solicitations, unauthorized commercial or "spam" messages also continue to proliferate.

When messages are transmitted from a sender on one messaging platform to one or more recipients on another messaging platform, the provision of messages between platforms may be performed by a messaging transport system. However, such messaging transport systems typically do not significantly differentiate between messages based on content—they simply route messages from one messaging platform to another.

BRIEF SUMMARY

Techniques are described herein for processing intra- and inter-messaging platform communications, including by receiving and analyzing messages originating from an originating device on one messaging platform for distribution to a destination device on that messaging platform or one or more other messaging platforms. Groups of messages with similar contents or other similar characteristics are identified and categorized, such as in accordance with configuration information regarding the originating messaging platform, the destination messaging platform, or some other entity involved with the transmission of the messages. Based on a determination of one or more categories associated with such an identified message group, various actions may be taken with respect to such message groups or with parties associated with such message groups, including actions based at least in part on the configuration information.

BRIEF DESCRIPTION OF THE DRAWINGS

Non-limiting and non-exhaustive embodiments are described with reference to the following drawings. In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn, are not intended to convey any information regarding the actual shape of the particular elements, and have been solely selected for ease of recognition in the drawings.

FIGS. 3A through 3D illustrate specific examples of particular information related to message analysis, such as may be generated, provided, or utilized by an embodiment of a Message Processing System in accordance with techniques described herein.

FIGS. 4A through 4K illustrate additional examples of particular information related to message analysis, such as may be generated, provided, or utilized by an embodiment of a Message Processing System in accordance with techniques described herein.

DETAILED DESCRIPTION

Figure 1:
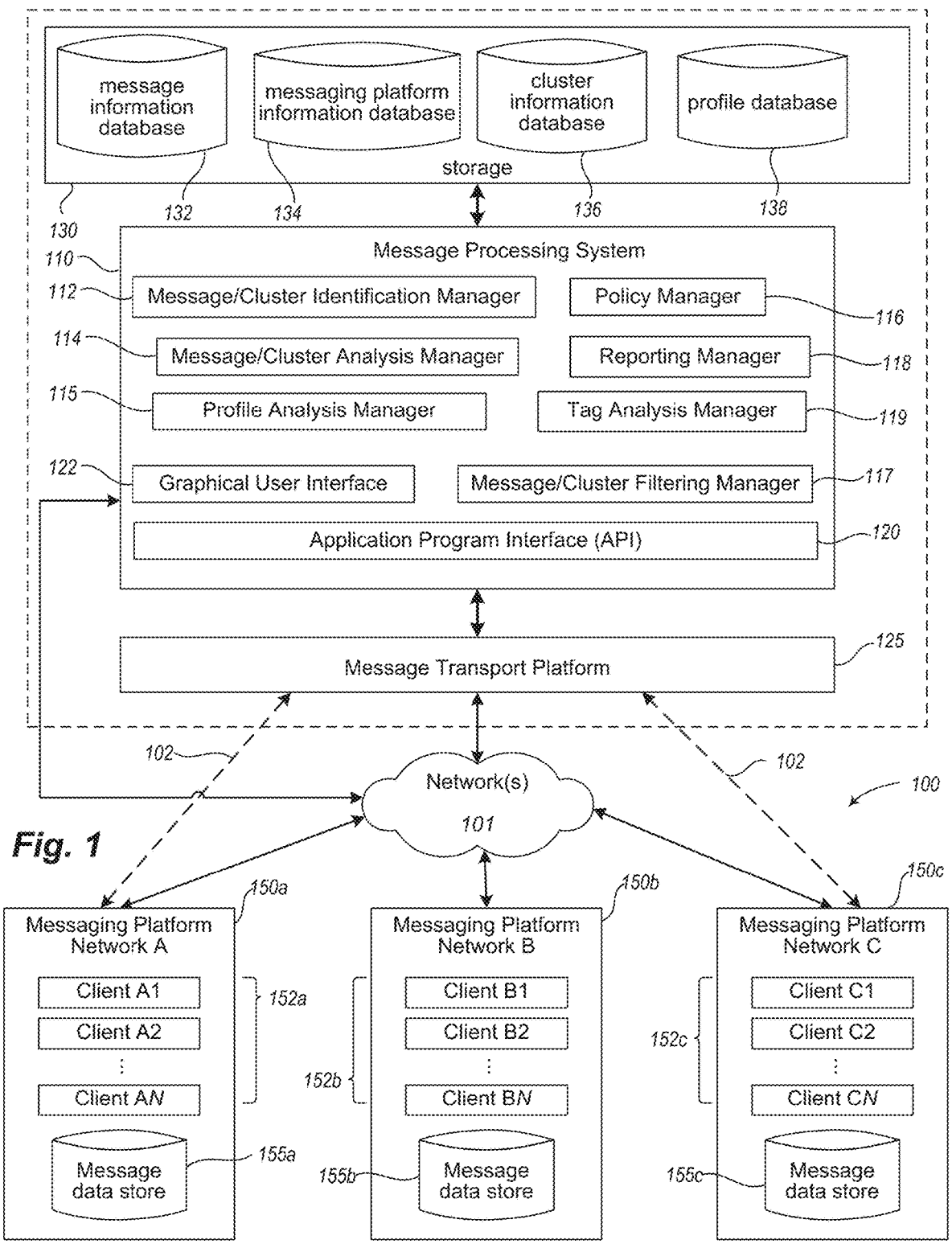
FIG. 1 is a schematic diagram of a networked environment that includes a Message Processing System in accordance with techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the vehicle environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The following is a brief introduction to messaging platform communications. In general, messages can be peer-to-peer ("P2P")(e.g., from a first personal communication device to a second personal communication device), application-to-person ("A2P")(e.g., from an application server to a personal communication device that has a corresponding application installed thereon), or machine-to-machine ("M2M")(e.g., from one non-personal device to another non-personal device, such as with Internet-of-Things devices). Messages sent from a first device associated with a first messaging platform to a second device associated with a distinct second messaging platform (e.g., a textual message sent from a Verizon subscriber to a T-Mobile subscriber or a textual message sent from a social-media-application server to a Verizon subscriber) may or may not be delivered by either or both of those two messaging platforms alone. For example, some P2P messages are carrier to carrier. However, some over-the-top service providers can also send and receive messages. In some scenarios, over-the-top service providers can connect and transmit messages with carriers either directly or through an interconnect vendor. In A2P and M2M messages, additional entities are often utilized in sending and receiving messages, which may include one or more carriers, over-the-top service providers, aggregators, brand or enterprise computing devices, etc.

In order to improve the routing of messages between messaging platforms, messages are often provided from the originating messaging platform to a message transport platform provider for forwarding to the destination messaging platform, which in turn handles delivery of the messages to the intended destination device within that destination messaging platform. In certain scenarios, the message transport platform may provide additional functionality, such as determining the correct destination messaging platform, appropriately decoding the message as provided by the originating messaging platform, and appropriately encoding the message for provision to the destination messaging platform.

Embodiments described herein can be implemented by one or more entity computing devices, systems, networks, or platforms that are utilizes to handle or forward messages between a sender device and a recipient device, including: carriers, interconnect vendors, over-the-top service providers, aggregators, or the like. Such embodiments enable entities to monitor and manage messaging traffic on their corresponding platforms.

The present disclosure is directed to techniques for providing additional functionality related to processing intra- and inter-platform messages, such as by analyzing message content and other characteristics of such messages to identify the classification of individual messages or clusters of similar messages to determine appropriate (and possibly platform-specific) categories or actions to perform based on the analyzed message. In some embodiments, an entity can take various actions with respect to messages associated with identified message clusters based on configuration information associated with an originating messaging platform, a destination messaging platform, another message transportation platform, or some combination thereof. For example, in certain embodiments, a group of multiple messages may be identified as a message cluster comprising one or more categories of spam; comprising particular categories of enterprise messages (such as two-factor authentication messages, service-to-device or device-to-service messages, account information, advertising, etc.); or other categories.

Depending on the determined categorization for a message or message cluster, in certain embodiments, messages of an identified message cluster may be prioritized over those of another identified message cluster; may be tagged or otherwise modified in accordance with one or more determined categories before messages of the identified message cluster are forwarded to a destination messaging platform, such as to identify the determined categories for use in handling of the messages by the destination messaging platform; blocked from being sent; or otherwise differentiated with respect to other messages that are not in the identified message cluster. Likewise, depending on the determined categorization for an individual message, such messages may be prioritized over other messages associated with other categories; tagged or otherwise modified in accordance with the determined categorization before the messages are forwarded to a destination messaging platform; or otherwise differentiated with respect to other messages associated with other categories.

Accurate and granular categorization of platform messages provides increased flexibility in the handling, prioritization, monetization, and filtering of such messages. Some or all of the techniques described herein may be performed by automated operations of an embodiment of a Message Processing System using a combination of machine learning and policy controls, as discussed in greater detail below.

As used herein, the terms "messaging platform" or "message processing provider" or "message processing entity" as used herein may be used interchangeably and refer to an entity or computing system that facilitates the reception, forwarding, processing, or dissemination of messages between an originating device and a destination device. Such messaging platforms may include carrier networks or non-carrier networks (e.g., service providers, aggregators, company or brand computing devices, or other entities). In some embodiments, a messaging platform may be a private network associated with a carrier, such as may be used by that carrier to provide its telephony, data transmission, and messaging services (e.g., in P2P communications). In other embodiments, the messaging platform may be a computing device or system that can generate or send messages to other computing devices (e.g., in M2M communications or in A2P communications). It will be appreciated that depending on the identities and affiliations of a message originating device and the intended message destination device associated with a given intra- or inter-platform communication, messaging platforms may operate as an originating messaging platform, a destination messaging platform, or an intermediate forwarding messaging platform, or a combination thereof, at any time. Messaging platforms can therefore include one or more private networks, one or more public networks, or some combination thereof. In various embodiments, the originating or destination device may be "mobile subscribers," such as in the case where a messaging transport platform (e.g., a customer of the Message Processing System) is itself a Mobile Network Operator and the message analyzed by the Message Processing System is then delivered directly to its mobile subscriber. One non-limiting example may be where an entity (e.g., Google) has a direct connection to submit messages to a carrier (e.g., Verizon), where the carrier is using the Message Processing system for its capabilities and then delivering the message to one of its subscribers.

As used herein, the term "carrier" refers to a provider of telecommunication services (e.g., telephony, data transmission, and messaging services) to its client subscribers. Non-limiting examples of such carriers operating within the United States may include Verizon Wireless, provided mainly by Verizon Communications Inc. of Basking Ridge, NJ; AT&T Mobility, provided by AT&T Inc. of DeKalb County, GA; Sprint, provided by Sprint Nextel Corporation of Overland Park, Kans.; T-Mobile, provided by Deutsche Telecom AG of Bonn, Germany; Facebook and/or Facebook messenger, provided by Facebook Inc. of Menlo Park, Ca; Twitter, provided by Twitter Inc. of San Francisco, CA; WhatsApp, provided by WhatsApp Inc. of Menlo Park, CA; Google+, provided by Google Inc. of Mountain View, CA; SnapChat, provided by Snap Inc. of Venice, CA, and the like.

The term "message" as used herein refers to textual, multimedia, or other communications sent by a sender to a recipient, and may be used interchangeably with respect to "communication" herein unless context clearly dictates otherwise. The sender or recipient of a message may be a person, a machine, or an application, and may be referred to as the originating device and the destination device, respectively. Thus, messages may be communications sent by one person to another person, communications sent by a person to a machine or application, communications sent by a machine or application to a person, or a communications sent by a machine or application to another machine or application. Non-limiting examples of transmission types for such communications include SMS (Short Message Service), MMS (Multimedia Messaging Service), GPRS (General Packet Radio Services), SS7 messages, SMPP (Short Message Peer-to-Peer) social media, Internet communications, firewall messaging traffic, RCS (Rich Communication Services), or other messages. The term "person" as used herein refers to an individual human, a group, an organization, or other entity. In some example embodiments, messages may include messaging traffic from firewalls, such that the Message Processing System described herein can be used to analyze this traffic (especially traffic blocked by Firewalls) to determine if blocked content could be authorized (where acceptable) and converted to monetizable traffic. As another example embodiment, messages may include RCS messages, where the Message Processing System described herein can be utilized to support analysis of message characteristics and content, such as to analyze chatbot-like automated, contextual responses and messages (e.g., by employing machine learning to train the Message Processing System with known chatbot responses).

The term "customer environment" or "customer platform" or "customer computing device" as used herein may be used interchangeably and refer to an entity associated with the reception, transmission, or dissemination of messages between an originating device associated with a originating messaging platform and a destination device associated with a destination messaging platform, where the customer utilizes a Message Processing System, as described herein, to classify and manage message transmissions and associated transmission information. Accordingly, the customer may be a carrier, the originating messaging platform, the destination messaging platform, an aggregator, over-the-top service providers, brand, enterprise, the originating device of a message, or other messaging platform or entity that is utilizing the Message Processing System described herein. Such entities may be referred to as "users," "customers," or "clients" of the Message Processing System or the messaging transport platform, as described herein.

The term "user" as used herein refers to a person, individual, group entity, organization, or messaging platform interacting with the Message Processing System that is used or implemented by a customer environment, including past, future or current users of such a system. Reference herein to a "user" without further designation may therefore include a single person, a group of affiliated persons, or other entity and may include the computing device used by such a user. In various embodiments, the user may also be referred to as a customer.

The term "message device identifier" as used herein refers to a unique identifier of a message originating device or a message destination device. The message device identifier may be a mobile device number (MDN), an Internet Protocol (IP) address, a media access control (MAC) address, or some other unique identifier. Thus, the message device identifier may be a sequence of digits, characters, or symbols assigned to a particular device or entity for data transmission via messaging platforms or other communications network (s).

A "P2P" or "peer-to-peer" message as used herein describes communications sent from a person to one or more other persons, and may in certain scenarios be contrasted with an "application-to-person" or "A2P" message sent to one or more persons and initiated by any automated or semi-automated facility, such as a hardware- or software-implemented system, component, or device. Typical but non-limiting examples of P2P messages include messages between individual persons of messaging platforms (e.g., "Hi Mom"); authorized promotional offers; non-authorized commercial solicitation (i.e., "spam"); etc. Typical but non-limiting examples of A2P messages include social media application messages, video game or other application messages, promotional offers; spam; device updates; alerts and notifications; two-factor authentication; etc. In addition, "machine-to-machine" or "M2M" messages as used herein include messages sent between automated facilities (such as "IoT" or "Internet of Things" communications), and may in certain scenarios and embodiments be used interchangeably to describe "application-to-application" or "A2A" communications. Typical but non-limiting examples of M2M messages include device updates; alerts and notifications, and certain instances of two-factor authentication. It will be appreciated from the examples above that P2P, A2P, and M2M message types are not mutually exclusive; various categories of communications may be appropriately associated with multiple such message types.

In some embodiments, a user of a customer's Message Processing System may define and implement a preferred scheme of message categorization (or may eschew such categorization entirely) for messages that are sent to, transmitted by, or delivered within the customer's network or associated with a particular messaging platform. The Message Processing System may operate to analyze and categorize both intra- and inter-messaging platform messages in a manner specific to the user-defined preferred scheme. In this manner, the Message Processing System provides user-specific categorization and analysis for messages within a particular network. For example, such user-specific categorization may effectively allow for the translation of an originating messaging platform's preferred categorization scheme into one or more destination messaging platforms' respectively preferred categorization schemes.

In addition, the Message Processing System may provide greater flexibility for traffic management and greater insight into messages transmitted between messaging platforms and how a messaging platform is being utilized, either by its own devices or subscribers or by others. A user (e.g., a messaging platform) may benefit by conducting in-network traffic management in a preferred manner without modifying such traffic for each destination network. Destination networks are enabled to define and configure how incoming traffic is to be handled.

In at least some embodiments, a user of a customer environment implementing a Message Processing System (e.g., a participating messaging platform or other entity involved with the forwarding of messages) may benefit from message analytic data generated by the Message Processing System as a result of such analysis and categorization. For example, a messaging platform can assign disparate fees or fee structures regarding the messaging platform's originating or destination devices that utilize disparate message volumes, disparate message categories, etc.

As another example, one or more fee structures may be specified by the user-specific configuration information provided to the Message Processing System by a particular messaging platform. In this way, the Message Processing System may assign one or more monetary charges to individual message device identifiers, message aggregation entities, or a particular messaging platform, that exceed certain message volume thresholds, category usage, or satisfy other specified criteria. For example, a messaging platform may determine to charge one monetary rate for messages in message clusters identified as P2P communications; a distinct second monetary rate for messages in message clusters identified as two-factor authentication A2P communications; a distinct third monetary rate for messages in message clusters identified as A2P communications other than to-factor authentication; a distinct fourth monetary rate for messages in message clusters identified as M2M communications; etc.

Moreover, even if the configuration information provided to the Message Processing System by a user does not explicitly include an indication of disparate monetization for various message categories applied to identified message clusters, such users may nonetheless benefit from such disparate monetization strategies. For example, a messaging platform can separately configure one or more automated billing systems based on message categorization to charge for such disparately categorized messages in a differentiated manner. In addition, users may benefit from various analytic information generated by the Message Processing System with respect to such monetization or potential monetization, such as to track changes in demand for message delivery corresponding to particular categories or other message cluster types.

In at least some embodiments, the Message Processing System may validate messages within one or more identified message clusters, such as in accordance with one or more subscriber agreements, or with configuration information provided by the user for a particular messaging platform with respect to one or more other messaging platforms (e.g., for a destination messaging platform with respect to an originating messaging platform). In one example embodiment, message clusters may be utilized to determine whether a message contains valid content for messages sent by an indicated message originating device or originating messaging platform.

Unlike traditional firewalls, where configuration is done manually (e.g., manually identify allowed incoming address and ports, manually identify a sender whitelist and blacklist, manually identify content filtered whitelists and blacklists, etc.), or fully automated machine learning systems (which can be very risky due to the vast differences in messages that could result in unacceptable messages being delivered or inadvertently blocking acceptable messages), embodiments described herein combines the benefits of manual systems with human-driven policy controls with the speed and automation of a core machine learning engine. In general, the Message Processing System described herein is based on natural language processing (NLP) deep learning models, which provide inference to messages. The machine learning models are trained offline, using training sets that consist of known messages. The training sets are labelled manually by expert labelers. Once the models reach a satisfactory level of performance, in terms of key performance indicators (KPIs), they are deployed in the Message Processing System. For training and inference purposes, before a message is sent to the models, it is translated into a vector of numbers using a method called "word embedding." Once in a vector format, it is read in by the models and an inference is given as a probability score (e.g., a risk rating). A threshold can be applied to the score and a binary decision, such as to label a message as spam or ham—although as described herein, other categories and classifications of messages may also be analyzed and managed.

Embodiments described herein can provide numerous different advantages. For example, the Message Processing System uses machine learning to analyze and classify messages, rather than a blunt instrument approach, which can be more dynamic and adaptive. The Message Processing System provides user interfaces that offer customers quick and usable policy capabilities to rapidly block or unblock message traffic based on system and customer-provided variables. The Message Processing System can be deployed in a way that only customer employees access the system, which can reduce the complications from third-party vendors that rely on a VPN connection into their device to make adjustments, which could put the customer in violation of agreements with their customers. The interface of the Message Processing System also provides rich reporting capabilities and analytics, which can be used to help educate customers (e.g., enterprise customers) on how manage message, how to not be blocked by carriers, and how to provide better user experience. Moreover, the Message Processing System is easily extendable to provide additional functionality beyond identifying and blocking spam, conversely it can be adapted to classify and handle A2P messages in a particular fashion. Likewise, the Message Processing System is a scalable solution that can be implemented for many different users.

FIG. 1 is a schematic diagram of a networked environment 100 that includes a Message Processing System 110 in accordance with techniques described herein. In addition, the networked environment 100 includes a messaging transport platform 125 and storage components 130, both communicatively coupled to the Message Processing System 110. The messaging transport platform 125 includes one or more computing systems (not separately depicted) to handle the receipt and transmission of messages to and from messaging platform networks 150a-150c, either directly or via one or more networks 101.

In various embodiments, storage components 130 may be operated by a third-party data storage service provider, such as a data storage service provider that may provide various cloud-based storage services. In other embodiments, the storage components 130 may be integrated into the Message Processing System 110 directly, and may be operated by a customer environment that operates the Message Processing System. In yet other embodiments, the messaging transport platform 125 may be operated by a third-party messaging transport service provider, may be integrated into the Message Processing System 110 directly, or may be operated by a customer environment that additionally operates the Message Processing System.

Furthermore, in various circumstances and embodiments, one or more of the messaging platforms operating Messaging Platforms A-C may operate and/or include an embodiment of a Message Processing System, either separately or in combined use with the Message Processing System 110, such as to perform analysis and categorization functions for communications processed entirely within the messaging platform's own network (e.g., messages sent between two devices associated with a single messaging platform). Thus, the Message Processing System may be deployed as part of a messaging platform, as a service model operated by an independent entity affiliated with one or more messaging operators of such messaging platforms, or in another manner such that the Message Processing System is communicatively coupled to one or more messaging platforms and messaging transport platform computing systems.

Figure 2A:
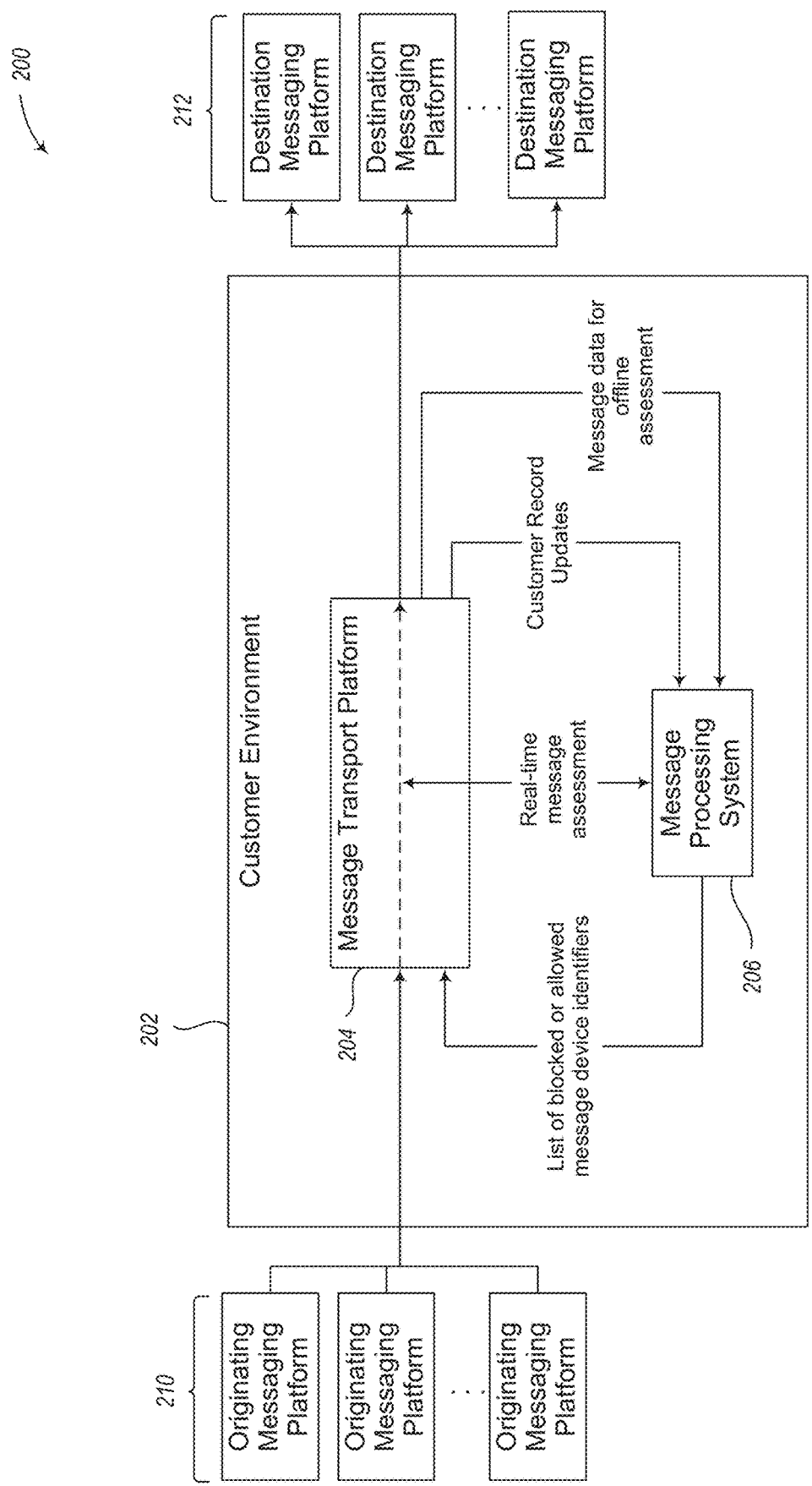
FIGS. 2A through 2C illustrate system diagrams of various environments for implementing a Message Processing System for a customer environment in accordance with techniques described herein.
Figure 2B:
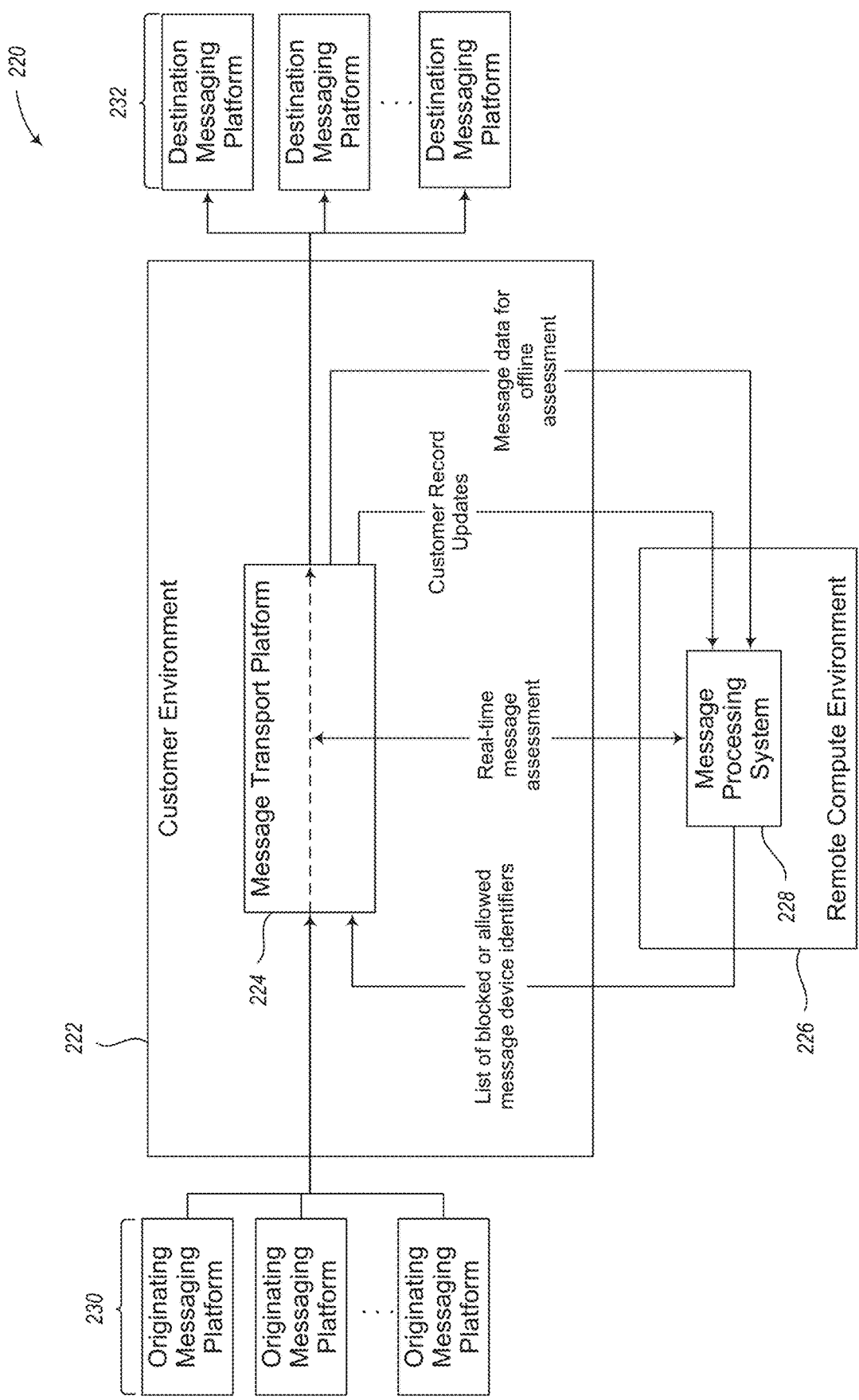
Figure 2C:
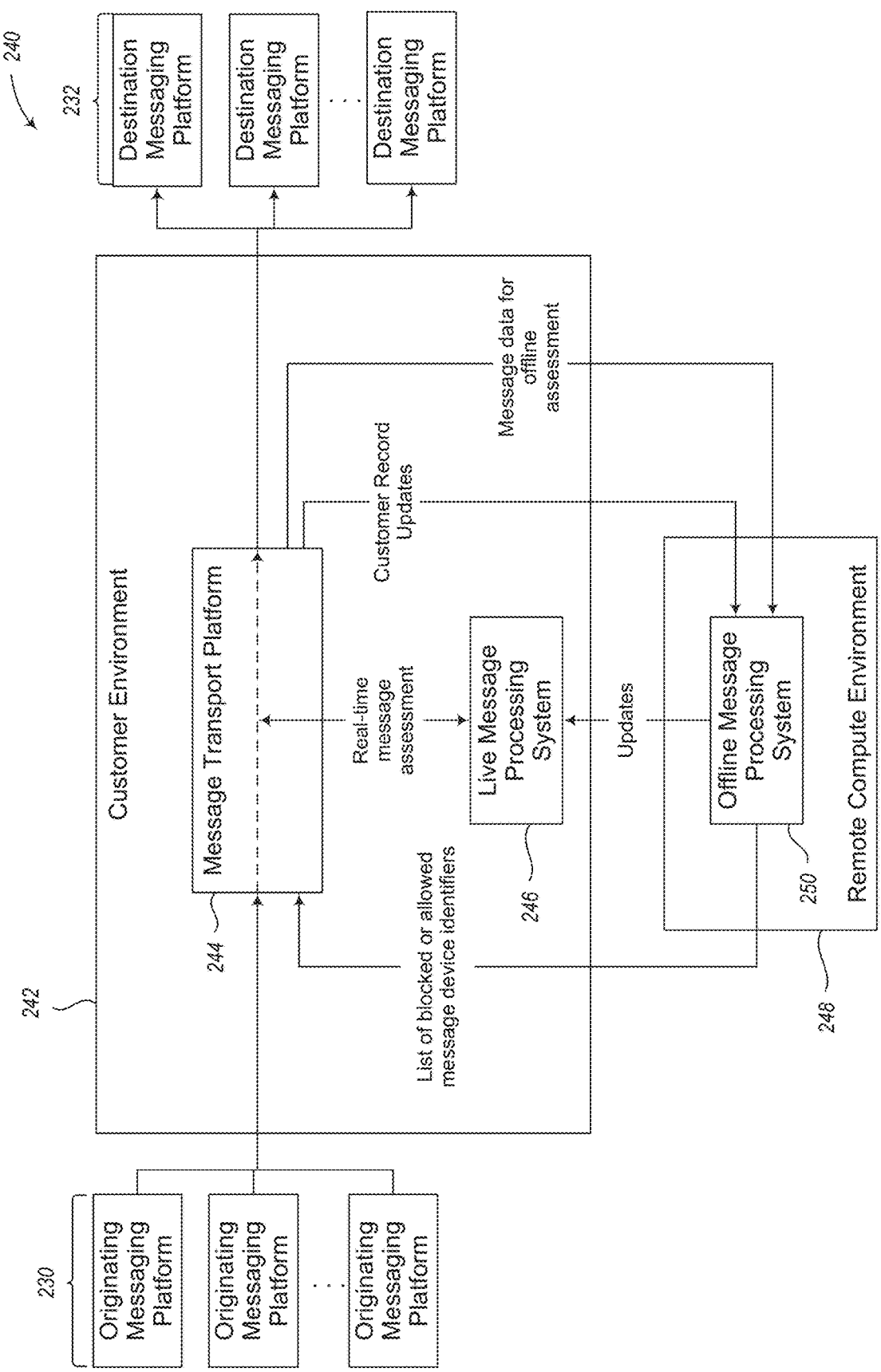

FIGS. 2A-2C illustrate various embodiments, of a customer environment and its local or remote utilization of a Message Processing System.

It will be appreciated that while the messaging transport platform 125 and storage components 130 are depicted in FIG. 1 as directly connected to the Message Processing System 110, such facilities may be communicatively coupled to the Message Processing System in other ways, such as via networks 101. In the depicted embodiment, the Message Processing System 110 includes a message/cluster identification manager 112; message/cluster analysis manager 114; policy manager 116; message/cluster filtering manager 117; and reporting manager 118, as well as an application program interface (API) 120 (for providing programmatic access to various functionality of the Message Processing System by remote executing software programs) and graphical user interface (GUI) manager 122. The storage components 130 include message information database 132, messaging platform information database 134, message cluster information database 136, and profile database 138. Moreover, while much of the discussion herein describes operations with respect to inter-messaging platform messages, it will be appreciated that functionality provided by the described Message Processing System may be provided by that system for intra-messaging platform messages as well, unless context clearly indicates otherwise.

The message information database 132 may store information regarding one or more individual messages. The messaging platform information database 134 may store information regarding one or more distinct messaging platforms, including number of messages to or from the platform, types of messages, number of senders or receivers, etc. The message cluster information database 136 may store information about one or more clusters identified by the Message Processing System 110. The profile database 138 may store metadata related to sender volumes, the ratio of sent to received messages (overall and to each individual connection messages have been exchanged with), and the ratio of an individual type of message sent to overall volume of messages sent, etc.

In the embodiment depicted by FIG. 1, the networked environment 100 further includes example messaging platforms 150a, 150b, and 150c, each of which is operated by a distinct messaging platform or entity. The messaging platforms 150a, 150b, and 150c are communicatively coupled to the messaging transport platform 125 via one or more networks 101 and to messaging devices (not shown) associated with one or more client devices 152. The messaging platforms 150a, 150b, and 150c also include a message data store 155. In particular, messaging platform A 150a is operated by Entity A (not shown), incorporates messaging devices associated with clients $A_{1-N}$ (152a), and includes message data store 155a; Messaging Platform B 150b is operated by Entity B (not shown), incorporates messaging devices associated with clients $B_{1-N}$ (152b), and includes message data store 155b; and Messaging Platform C 150c is operated by Entity C (not shown), incorporates messaging devices associated with clients $C_{1-N}$ (152c), and includes message data store 155c. In certain embodiments and scenarios, one or more of the messaging platforms 150 may be communicatively coupled to additional components not depicted within FIG. 1 for the sake of clarity, such as various computing systems, additional data storage, and other additional components.

In various embodiments, the Message Processing System 110 may receive large volumes of messages (such as tens or even hundreds of thousands of messages per minute) from each of one or more of the messaging platforms 150 via the messaging transport platform 125. In certain embodiments and scenarios, the Message Processing System 110 may separate such messages according to an originating messaging platform, a destination messaging platform, or both. In other embodiments, the Message Processing System 110 may collectively analyze a volume of messages received from multiple originating messaging platforms via message transport platform 125 without separating the messages according to originating messaging platform prior to analysis.

In certain embodiments the Message Processing System 110 may analyze and further process incoming messages in real-time—that is, as the messages are received from the messaging transport platform 125. In other embodiments and scenarios, messages may be received by the Message Processing System 110 and stored (such as via storage components 130) for later analysis, such as to provide post-delivery message analytic information to one or more users, one or more of the associated messaging platforms 150, to a particular messaging transport platform, or other entity.

In various embodiments, the Message Processing System 110 may perform such post-delivery analysis upon user request, continuously in a streaming manner, periodically (such as at predefined and/or messaging platform-specified intervals), after receiving a predefined quantity of messages for analysis, or in response to other events. Moreover, as noted elsewhere herein, in certain embodiments and scenarios, a messaging platform may provide the Message Processing System 110 with messages having destinations within the messaging platform's own network, such as to receive message analytic data generated by the Message Processing System 110 for the messaging platform's in-network message traffic, to perform particular actions with respect to messages based on categorization of those messages by the Message Processing System, or to enable various other functionality provided by the Message Processing System with respect to inter-messaging platform messages.

For each message received from one of the messaging platforms 150 (such as via the message transport platform 125), the Message Processing System 110 may analyze characteristics of the received message in order to identify clusters of similar messages. Non-limiting examples of such message characteristics may include contents of the message (e.g., keywords, an embedded URL, etc.); a message type (e.g., P2P, A2P, etc.) ; a transmission type (e.g., SMS, MMS, GPRS, or other type); a sender message device identifier of the message; a recipient message device identifier of the message; a length of the message; a volume of messages directed to or from one or more originating or destination devices associated with the message, or associated with similar or identical messages (e.g., message "velocities"); metadata associated with the message; message latency and similar network communication metrics; and other identifying characteristics. In addition to analyzing message characteristics of messages received at the same or similar times, in certain embodiments the Message Processing System 110 may perform various comparisons with previously analyzed messages and/or previously identified message clusters, such as to compare a current message with one or more messages previously identified (by the Message Processing System or otherwise) as having similar or identical contents, message type, sender message device identifier, intended recipient message device identifier, or other similarities.

In certain embodiments, the Message Processing System 110 may perform various additional operations in order to identify message clusters, such as by comparison to stored historical data regarding other messages and message clusters previously identified, use of machine learning, natural language processing, heuristic analysis, Bayesian analysis, random forest algorithms, Deep Learning or Neural Network techniques, and other learning or clustering techniques.

For example, the Message Processing System 110 may identify one or more message clusters based on determining a degree of similarity between keywords or other characteristics of the communications. In at least some circumstances and embodiments, the CMP machine learning system may be "trained" by being provided with one or more messages previously identified as corresponding to one or more indicated categories, such as to determine a degree of similarity between message characteristics associated with newly received messages and message characteristics, including feature vectors, associated with the previously identified messages.

As another example, the Message Processing System 110 may utilize message fingerprinting to analyze incoming messages, such as by comparing results of applying a hash function or other algorithm to an incoming message with results of applying the hash function or other algorithm to one or more previously received messages. Furthermore, in certain embodiments the Message Processing System may identify message clusters independent of or contrary to particular message characteristics, such as if an originating sender or message aggregation entity provides false metadata to obscure the origination of particular messages analyzed by the Message Processing System. In this manner, the Message Processing System may determine a "true" origin of such messages even in scenarios in which particular message metadata is missing, erroneous, or deliberately misrepresented.

One or more entities associated with messaging platforms 150 may, in addition to providing outgoing communications to the Message Processing System 110 via one or more computing systems of the message transport platform 125, provide (via networks 101 or otherwise) the Message Processing System with various user-specific configuration information related to the processing of messages that are directed to or from one or more particular messaging platforms. Such configuration information may in certain embodiments specify definitions, descriptions, and identifiers for one or more categories of message to be used by the Message Processing System 110 for messages having an intended destination that is associated with a respective messaging platform. In at least some embodiments and scenarios, such specified categories may be similar or identical to those used within the messaging platform for its own in-network traffic.

In addition, in certain embodiments the user-provided configuration information may include an indication of one or more subscriber agreements (such as between a messaging platform and an individual message device identifier, between an originating messaging platform and an operator of a destination messaging platform, between a message aggregation entity and an operator of a destination messaging platform, or other subscriber agreement), such that the Message Processing System may validate messages of one or more message clusters to determine whether the message content is in accordance with the indicated subscriber agreement. For example, a subscriber agreement between an originating messaging platform and an operator of a destination messaging platform may include an indication of one or more restrictions associated with M2M communications. The Message Processing System may validate messages of an identified M2M message cluster to determine whether the messages conformed to the indicated restrictions.

Non-limiting examples of categories that may be identified by the Message Processing System 110 (such as via cluster identification manager 112 and/or cluster analysis manager 114) may include non-authorized "spam" solicitation (commercial or otherwise); smishings or SMS phishing (which may include messages that appear to be legitimate and from a trusted source, but elicit a "call-to-action," such as clicking on a URL, calling a phone number, replying to message with personal information, to attempt to access and steal personal "assets" from the targeted subscriber, including login/access to online financial institution, or other information that can compromise the integrity off subscribers' person or assets, etc.); spoofing (e.g., using the message device identifier of the sender, but the message is sent from an unauthorized source connection); promotional offers (which may be similar to spam messages, but distinguishable in accordance with various criteria, such as originating from a sender having a pre-existing commercial or other relationship with the intended recipient); device updates (e.g., to provide status information or other automated information regarding one or more devices having access to a messaging platform, such as may be intended for a human recipient, for one or more applications executing on a device associated with such a recipient, etc.); alerts or notifications (e.g., amber alerts, news or other alerts previously requested and/or defined by a client, or other alerts and notifications); two-factor authentication (such as may be implemented by an automated service as a secondary means of authorizing access to the automated service); unique P2P messages, such as may typically be sent between two individual clients (e.g., "Where R U?"); and other categories.

Each category used by the Message Processing System 110 for potential application to one or more identified message clusters may be specified with any level of granularity. As one example, rather than identifying and treating all messages categorized as spam in an identical manner, a user may specify within the configuration information provided to the Message Processing System 110 multiple categories of spam messages. In this scenario, the configuration information may specify that spam messages with an embedded URL or other user-selectable element be categorized, identified to the corresponding messaging platform, routed, and/or modified by the Message Processing System 110 in a manner different than that used for spam messages that do not have such an embedded URL or user-selectable element.

Continuing the example, the Message Processing System 110 may associate distinct categories with identified message clusters based on additional criteria, such as using machine learning to predict (e.g., based on historical message analytic data, on correctly identified messages intentionally provided to the Message Processing System for training or other purposes, etc.) that messages of an identified message cluster exceed a threshold likelihood of being spam; detecting one or more prohibited keywords or suspicious URL within message contents of an identified message cluster; etc. Such granular categorization enables flexibility with respect to particular actions to take when processing messages for the destination messaging platform, as well as enabling more detailed message analytic data to be generated by the Message Processing System 110 and used when reporting such data (if requested) to the corresponding user. Additional examples of particular categories are provided elsewhere herein, such as with respect to FIGS. 2A-2D and FIGS. 3A-3D.

As noted above, in certain embodiments the determination of categories associated with an identified message cluster may be made based on user-specific configuration information, which may include messaging-platform-specific configuration information. As one example, a user can provide a list of predefined message categories to be used for messages intended for recipient client devices 152 of a corresponding messaging platform 150.

In certain embodiments, the Message Processing System 110 may utilize machine learning and other techniques to dynamically create additional categories or sub-categories based on particular message characteristics of messages within an identified message cluster. For example, in at least one embodiment the Message Processing System 110 may both identify a message cluster and dynamically create a category identifier for that identified message cluster in response to detecting new mutations of spam; new A2P campaigns or functions (e.g., recognizing a new device type that has begun to utilize A2P messaging via one or more messaging platforms).

In some embodiments, such dynamically created categories may be verified, deleted, or modified by the user of the Message Processing System 110. In various scenarios and embodiments, such dynamically created category identifiers may be preserved when forwarding messages to a destination messaging platform. In other scenarios and embodiments, the dynamically created category identifiers may be utilized within message analytic data generated and stored by the Message Processing System 110, but may be translated by the Message Processing System to a user-specified category when messages associated with the dynamically created category are forwarded to the destination messaging platform.

In at least some embodiments the configuration information provided to the Message Processing System 110 may specify one or more actions to perform with respect to messages associated with particular categories for particular identified message clusters. In the depicted embodiment of FIG. 1, policy manager 116 may determine particular such actions to perform based on configuration information associated with a particular messaging platform for each message within the identified message cluster.

Non-limiting examples of such actions include tagging, such as to associate a message with an identifier associated with one or more categories, or to modify such a message to include that identifier (e.g., by modifying metadata of the message, contents of the message, or other modification); prioritization, such as to prioritize delivery of an identified message cluster associated with one category (e.g., amber alerts, two-factor authentication messages, or other message types needing urgent or semi-urgent delivery) over another identified message cluster associated with one or more other categories (e.g., promotional messages, or other non-emergent messages, which may be delivered when network congestion is low); and filtering, such as to modify, prevent or delay delivery of particular categories of identified message clusters (e.g., to prevent delivery of messages that include a malicious or other embedded URL, or to modify the message in a manner that removes the threat indicated by the embedded URL).

In various circumstances, messaging platforms have been faced with "grey routing," in which a message sender (e.g., a low-cost message aggregation service) attempts to avoid charges incurred to an operator of a destination messaging platform (e.g., a messaging platform with which the sender does not have a commercially binding agreement for message delivery). In an attempt to avoid such charges, such senders may attempt to mask the origin of messages intended for a destination devices of the messaging platform. Grey route messages may result in a negative impact on reputations of both the message sender and operator of the destination messaging platform, as such messages may not be delivered reliably or in a timely fashion as a result of the manner in which such messages are masked and routed to the destination messaging platform. By accurately identifying grey route messages, the Message Processing System may take various actions to reduce such negative impacts and prevent future grey routing.

For example, the Message Processing System may block, delay delivery of, or tag individual messages within a message cluster identified as having a source that has been incorrectly labeled. In this manner, the Message Processing System may ensure that senders remain compliant with content such senders are allowed to send to a destination messaging platform, such as in accordance with established agreements between the parties; increase delivery rates and customer satisfaction; allow a messaging platform to correctly charge for (or otherwise appropriately monetize) delivery of such "grey route" messages. Furthermore, in certain embodiments the Message Processing System may, based at least in part on the identification of grey route messages, provide an indication of the originator of such messages to an operator of a destination messaging platform, such as to suggest development of an additional subscriber agreement between the messaging platform and the grey route messages originator.

In addition to actions performed by the Message Processing System 110 with respect to messages of an identified message cluster associated with particular categories, the Message Processing System may perform various actions with respect to senders and/or recipients of particular such messages, either as indicated by messaging platform-specified configuration information or otherwise. For example, in certain embodiments the Message Processing System 110 may determine to associate one or more status identifiers with a particular message device identifier under various circumstances, such as if various aspects of messages associated with the message device identifier satisfy user-specified or other criteria indicating that the message device identifier is associated with a purveyor or likely purveyor of spam, or of messages associated with one or more other disfavored message categories.

As one non-limiting example, the Message Processing System 110 may in certain circumstances assign a "risk rating" to one or more message device identifiers or all unique message originating devices, such as to indicate a greater or lesser likelihood that a particular message device identifier is associated with messages having disfavored content (e.g., spam or other solicitation, disallowed URLs, suspect keywords, etc.).

In certain embodiments, the Message Processing System 110 may modify a risk rating associated with a particular message device identifier in response to particular events or criteria being satisfied, such as to increase the risk rating for an message device identifier each time the message device identifier sends one or more messages of an identified message cluster associated with one or more disfavored categories, or to lower such risk rating each time the message device identifier sends one or more messages of an identified message cluster of one or more favored categories (e.g., unique P2P messages). The risk rating may also be adjusted to reflect the volumetric properties of a sender, including the ratio of sent-to-received messages with recipients of the sender's messages.

In addition, the Message Processing System may provide information regarding particular message device identifiers to one or more users or messaging platforms, such as to allow the operator of such a messaging platform to take additional action against individual message device identifiers associated with risk ratings that exceed one or more defined thresholds. Moreover, in various embodiments the Message Processing System may identify a pool of message device identifiers associated with one or more identified message clusters, such as if one or more senders of disfavored message categories are attempting to hide a volume of transmitted messages by spreading such messages over multiple originating message device identifiers.

In certain scenarios, a user may specify (such as part of the user configuration information provided to the Message Processing System 110 for use in processing messages with origins or destinations associated with a particular messaging platform) a particular risk rating threshold to use when evaluating risk ratings of a message device identifier associated with messages of a particular category.

For example, in some embodiments, a user may specify a risk rating threshold for one or more message device identifiers that utilize a particular messaging platform (e.g., the user may be the messaging platform of interest). The risk rating threshold may indicate at what level or risk rating an originating device or message is identified as suspect (e.g., spam), non-suspect, or some other category. The risk rating thresholds can be set for individual messaging platforms, for separate groups of messaging platforms, or generally for all messaging platforms. For example, if the risk rating scores for message device identifiers can between 0 and 100, where 100 indicates absolute spam and 0 indicates absolute non-spam, the risk rating threshold may be set to 90 such that messages from any message device identifier (or particular originating messaging platforms) that has a risk rating score over 90 will be blocked as a spam message. In some embodiments, multiple risk rating thresholds may be utilized. For example, in addition to the 90 risk rating threshold identified previously, a messaging platform may set a second risk rating threshold at 80 such that message from any message device identifier that has a risk rating score over 80 (but less than 90) will be identified as suspect for additional screening or user input.

The risk rating score may be determined based on numerous different factors associated with the message device identifier or the message sent from the message device identifier. These factors may include, but are not limited to, use of URLs in the message, use of known malicious URLs in the message, punctuation or spelling errors in the message, random or non-standard capitalization utilized in the message, improper grammar in the message, utilization of known key words, number of sent messages v. number of received messages, frequency of sent messages, Although the risk rating is described as being determined for individual message device identifier, in some embodiments, a risk rating may be defined for a particular messaging platform. For example, if an originating messaging platform is known to support message device identifiers that send spam messages, then that sending platform may have a risk rating higher than the risk rating threshold. In this way, if a message device identifier has a low risk rating, but it is sending messages via this high risk-rating messaging platform, then messages from that message device identifier may be blocked as spam, even if the risk rating of the individual message device identifier is below the risk rating threshold. In some embodiments, messages from this message device identifier may be further screened or provided to a human reviewer to determine if the messages are indeed spam. If the messages are not spam, then that message device identifier may be put on a whitelist or otherwise identified as a message device identifier that does not send spam messages. However, because of the message device identifier utilizes a high risk messaging platform, messages from that message device identifier may be re-reviewed more frequently than messages from message device identifier of other messaging platforms to determine if the whitelist designation is still appropriate.

Moreover, the risk rating can be increased or decreased over time. For example, if a message device identifier is assigned a risk rating of 80 because of poor punctuation and grammar—that risk rating may be reduced over time so long as additional risk factors are not identified. Conversely, the Message Processing System may determine to decrement a risk rating for a message device identifier based on one or more messages identified as non-suspect or beneficial or a reduction in the utilization of risk factors. In this manner, the Message Processing System 110 may provide additional flexibility when handling or identifying particular disfavored message device identifier usage, rather than (as one example) banning all purveyors of spam without additional distinction. Alternatively, if a user wishes to ban all purveyors of spam from utilizing a particular messaging platform without such additional distinctions, the Message Processing System can provide such functionality as well. In general, the risk rating is dynamically computed by taking into account the machine learning probability assessed for the content of each message (e.g., by using machine learning from a corpus of known messages and their categories, including spam messages, non-spam or ham messages, or other categories of messages, to identify a probability that an incoming message is a spam or a particular category) combined with other metadata about the traffic patterns for each sender (e.g., balance between messages set vs received, percentage of spam or non-compliant messages sent vs compliant or non-spam messages sent, etc.).

In certain embodiments, the user configuration information may specify additional message management policies. As non-limiting examples, the Message Processing System 110 may enforce policies regarding message device identifier blacklists or whitelists (respectively indicating to block or allow messages from specified message device identifiers or message platforms); keyword blacklists or whitelists (respectively indicating to block or allow messages containing specified keywords); URL blacklists or whitelists (respectively indicating to block or allow messages containing specified URLs, specified portions of URLs such as one or more indicated domain names, or other hyperlinks); and risk rating policies, such as to block individual messages or all messages sent to or from a message device identifier associated with a risk rating that exceeds a defined threshold, as discussed above, or to constrain or "throttle" a quantity of messages the associated message device identifier is allowed to send or receive in (or for) a particular period of time, or other policy related to modifying a user's messaging rights and privileges based on a dynamically calculated risk rating for a particular message for a particular message device identifier.

The Message Processing System 110 may in various embodiments provide detailed reporting to one or more users. The reports may include information regarding one or more categories assigned by the Message Processing System 110. The reporting provides views and perspectives on the composition of messaging traffic, such as message device identifiers sending or receiving messages, traffic associated with particular messaging platforms, message clusters, etc. These reports can be provided at an executive summary level, which provides high-level information to the user, or they can be at more granular levels, which allow the user to drill-down through various views to see more detailed traffic-related information. This type of drill-down functionality allows a user to see the sending and receiving entities (e.g., enterprises, aggregators, carriers, etc.), information associated with individual routes of messages, or information regarding particular message device identifiers or other information. In addition to providing overall visibility, the Message Processing System allows non-compliant traffic and senders to be easily identified so that defined policies can be enforced (e.g., blocking spam, downgrading the delivery priority for message types that are not time-critical or do not comply with the expected type of traffic from a particular sender, etc.). A few illustrative examples of the types of reports, information, and drill-down options provided to a user are illustrated in FIGS. 3A-3D and FIGS. 4A-4D.

As additional non-limiting examples, the reporting may include information regarding message counts in accordance with a particular type of policy violation (e.g., URL or keyword violations) over a specified period of time; information regarding a quantity of messages within one or more message clusters identified as spam; a predicted likelihood that messages within one or more identified message clusters are spam; volume comparison of an identified message cluster to total traffic analyzed over a similar or identical period of time; a ratio of a quantity of communications sent by one or more identified message device identifiers to a quantity of communications received by the one or more identified message device identifiers (such as to identify a message device identifier with a high ratio of sent-to-received messages, indicating an increased likelihood that the message device identifier originates spam); a frequency of analyzed message routes (such as to identify one or more messaging platforms associated with high frequencies of disfavored message categories); a frequency of analyzed message device identifiers (such as to identify one or more individual or groups of message device identifiers associated with high frequencies of disfavored message categories); usage frequency of one or more specified keywords; tabular or "word cloud" representations of keyword frequency; and other information. In various embodiments, such information may be provided by the Message Processing System 110 in textual, tabular, graphical or other formats, and may in certain scenarios be presented in one or more formats specified by a user (such as via the configuration information provided to the Message Processing System).

In certain embodiments, the Message Processing System may additionally provide message generation functionality in accordance with one or more defined categories of messages. For example, in various circumstances a user or other client of an operator of the Message Processing System may request that the Message Processing System generate one or more messages for delivery to one or more clients of one or more particular messaging platforms, such as to provide generated customer service or other messages. In this manner, the Message Processing System may utilize prior messages of identified message clusters as models for generating new messages (such as "chatbot" or other types) that are similar to such prior messages in various aspects.

To continue the example, the Message Processing System may identify a user inquiry to one or more defined destination devices on a destination messaging platform, and may generate and/or send one or more messages in response to the identified user inquiries. Additional non-limiting examples may include providing feedback to one or more clients of a participating messaging platform, providing free or monetized content to one or more clients of a participating messaging platform, order tracking, etc. Over time, the Message Processing System may determine to expand such message generation functionality to reflect a larger volume of messages (e.g., inquiries or appropriate responses) observed by the Message Processing System.

In the depicted embodiment of FIG. 1, the network 101 is a publicly accessible network of linked networks, possibly operated by various distinct parties, such as the Internet, although in other embodiments the network 101 may have other forms. For example, the network 101 may instead be a private network, such as, a corporate or university network that is wholly or partially inaccessible to non-privileged users. In still other embodiments, the network 101 may include both private and public networks, with one or more of the private networks having access to and/or from one or more of the public networks.

Furthermore, the network 101 may include various types of wired and/or wireless networks in various situations. In addition, in this illustrated example of FIG. 1, the messaging platforms 150 and respective clients152 may use client computing systems and/or other client devices (not shown) to interact with the Message Processing System 110 as a user of the Message Processing System 110 to obtain various described functionality via the network 101, and in doing so may provide various types of information to the Message Processing System 110. Moreover, in certain embodiments, the various entities depicted within the networked environment 100 may interact with the Message Processing System 110 using an optional private or dedicated connection, such as one of dedicated connections 102. For example, dedicated connections 102 may include one or more VPN (Virtual Private Network) connections.

FIGS. 2A through 2C illustrate system diagrams of various environments for implementing a Message Processing System for a customer environment in accordance with techniques described herein. In particular, FIG. 2A depicts environment 200 as including a customer environment 202, one or more originating messaging platforms 210, and one or more destination messaging platforms 212. As described herein, the customer environment 202 may be part of an originating messaging platform, a destination messaging platform, an aggregator, an over-the-top service provider, or other entity associated with the transmission of a message from an originating device (not shown) on an originating messaging platform 210 to a destination device (not shown) on a destination messaging platform 212.

The customer environment 202 includes a message transport platform 204 and a Message Processing System 206. The message transport platform 204 may be similar to the message transport platform 125 in FIG. 1 to facilitate the receipt, analysis, and transmission of messages. And the Message Processing System 206 may be similar to the Message Processing System 110 in FIG. 1 to analyze messages for message cluster generation or comparison and message management thereof.

The customer environment 202 receives an incoming message from an originating messaging platform 210 and provides it to the message transport platform 204. The message transport platform 204 accesses a list of messaging device identifiers that have been previously identified (by the Message Processing System 206 or by a user) as being allowed or block. If the message device identifier of the originating device (or originating messaging platform) associated with the message is blocked, then further transmission of the message towards the recipient is blocked. If, however, the message device identifier is allowed, then the message transport platform 204 processes and forwards the message to the appropriate destination messaging platform 212 for dissemination to the appropriate destination device.

If the message device identifier of the originating device associated with the message is not on the allowed/blocked list, then the message transport platform 204 forwards the message or message data to the Message Processing System 206 for a real-time message assessment. The Message Processing System 206 employs embodiments described herein to analyze and categorize the message. In various embodiments, the Message Processing System 206 employs one or more policies to determine or categorize the individual message. Such policies can be based on the content of the message, the sending and receiving habits or history for the originating device message device identifier, risk rating policies, or the like. For example, the Message Processing System 206 may compare the content of the message to one or more message clusters to determine if the message satisfies some threshold criteria to be considered as part of a message cluster. Such comparisons may include machine learning Natural Language Processing (including character or word vector analysis and other Neural Network techniques), keyword/phrase rules, grammar rules, URL rules, etc. If the message satisfies such threshold criteria, then the message may be categorized in a manner similar to the messages in the message cluster, such as if the content of the message is similar to a message cluster identified as span, then the message is identified as spam. As another example, the Message Processing System 206 may utilize one or more content or grammar rules to determine if the message includes content that is known to be spam-related, and if so, identify the message as spam.

The results of the analysis are provided back to the message transport platform 204 so that the message transport platform 204 can further process the message based on the results. For example, if the Message Processing System 206 identified the message as spam, then the Message Processing System 206 notifies the message transport platform 204 to block further transmission of the message. Conversely, if the Message Processing System 206 identifies the message as some other non-spam category, then the Message Processing System 206 instructs the message transport platform 204 to process and transmit the message to the appropriate destination messaging platform 212.

Moreover, the Message Processing System 206 updates a risk rating for the message device identifier of the originating device associated with the message. In some embodiments, the message device identifier may be associated with a previously determined risk rating. If that risk rating was not sufficient to exceed a risk rating threshold to preemptively block the message, then that message device identifier would not have been on the allowed/blocked list. Based on the results of the analysis by the Message Processing System 206, the risk rating is increased or decreased for that message device identifier. For example, if the message includes many spam-related factors, then the risk rating for that message device identifier may be increased towards or to exceed the risk rating threshold. Otherwise, the risk rating may remain the same or be decreased. In various embodiments, the Message Processing System 206 updates the allowed/blocked list based on the results and provides the updated list to the message transport platform 204.

In various embodiments, the message transport platform 204 may provide customer record updates and message data to the Message Processing System 206. The customer record updates may include volume data (e.g., number of messages per minute), originating or destination message platform statistics, etc. The message data may include messages that the message transport platform 204 previously cleared and transmitted towards the destination messaging platform 212. In this way, the Message Processing System 206 can further process these messages in an offline or non-real time manner. Such offline processing can be useful in tracking and updating previously allowed or blocked message device identifier, updating or re-training cluster algorithms, etc.

FIG. 2B is similar to FIG. 2A in that it depicts environment 220 as including a customer environment 222, one or more originating messaging platforms 230, and one or more destination messaging platforms 232. In this example, the customer environment 222 includes a message transport platform 224, which is similar to the message transport platform 204 in FIG. 2A. Unlike the customer environment 202 in FIG. 2A, however, the customer environment 222 in FIG. 2B does not directly implement the Message Processing System 228. Rather, the Message Processing System 228 is implemented by a remote computing environment 226, such as via cloud computing resources. In this way, the customer environment 222 does not have to obtain and maintain the computing resources necessary to implement the Message Processing System 228.

Thus, when the message transport platform 224 determines that an incoming message is to be analyzed by the Message Processing System 228, then the message transport platform 224 sends the message or specific message data to the remote compute environment 226 to be analyzed by the Message Processing System 228. At this point, the Message Processing System 228 can analyze the message and provide results similar to Message Processing System 206 in FIG. 2A.

FIG. 2C is a hybrid approach that incorporates different aspects of customer environment 202 from FIG. 2A and customer environment 222 from FIG. 2B. In particular, the functionality of the Message Processing System 206 in FIG. 2A and the Message Processing System 228 in FIG. 2B is separated into a live Message Processing System 246 and an offline Message Processing System 250.

In the illustrative environment 240 in FIG. 2C, the live Message Processing System 246 is maintained by the customer environment 242 to provide real-time processing of messages received by the message transport platform 244 from an originating messaging platform 230. Conversely, the offline Message Processing System 250 is implemented by a remote computing environment 248 to provide additional message analysis and cluster training. In this way, the customer environment can provide faster real time analysis and transmission of messages to an appropriate destination messaging platform 232.

Each of the environments in FIGS. 2A-2C provide different benefits to the corresponding customer environments. For example, by having the Message Processing System implemented by the customer environment, as illustrated in FIG. 2A, messages can be more quickly analyzed and transmitted to the appropriate destination messaging platform, which can provide a more real-time response and transmission of incoming messages. Unfortunately, the customer environment would also have to support sufficient computing resources to support the offline updating and training functionality, which could be very expensive. If the customer environment is processing high volumes of messages and implements no or very little offline analysis, then the system illustrated in FIG. 2A may be beneficial.

Conversely, because FIG. 2B illustrates the Message Processing System as being implemented by a remote compute environment, additional transmission and processing latency may occur, which can impact the real-time aspect of message transmission. Therefore, if the customer environment is processing lower volumes of messages or does not have sufficient computing resources, then the system illustrated in FIG. 2B may be beneficial.

Finally, FIG. 2C provides a mix of faster response time for real-time message analysis, while not having to support sufficient resources to perform the offline updating and training. Such as system, however, can produce additional overhead updating and management between the local live Message Processing System and the remote offline Message Processing System.

Figure 3A:
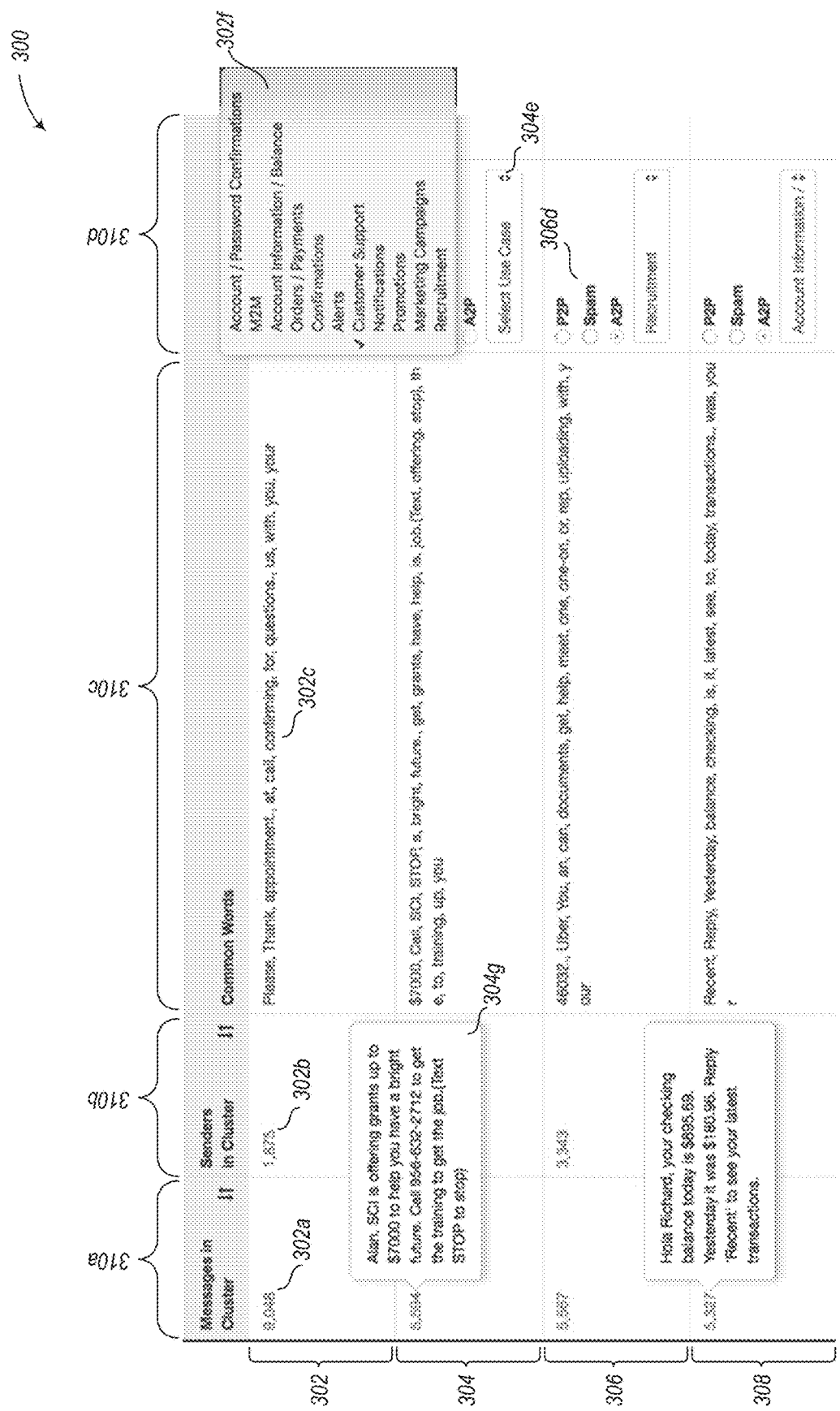
Figure 3C:
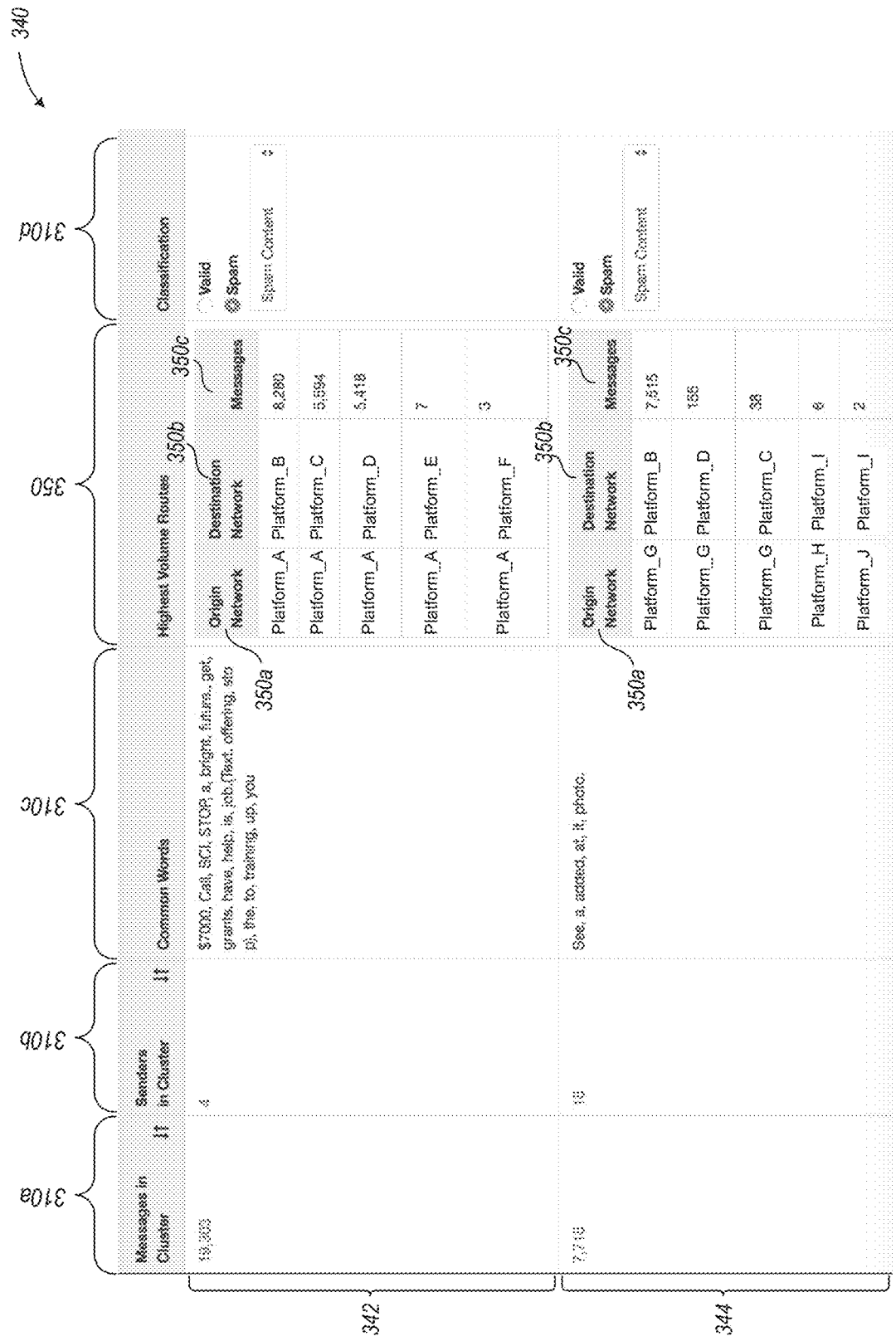
Figure 3D:
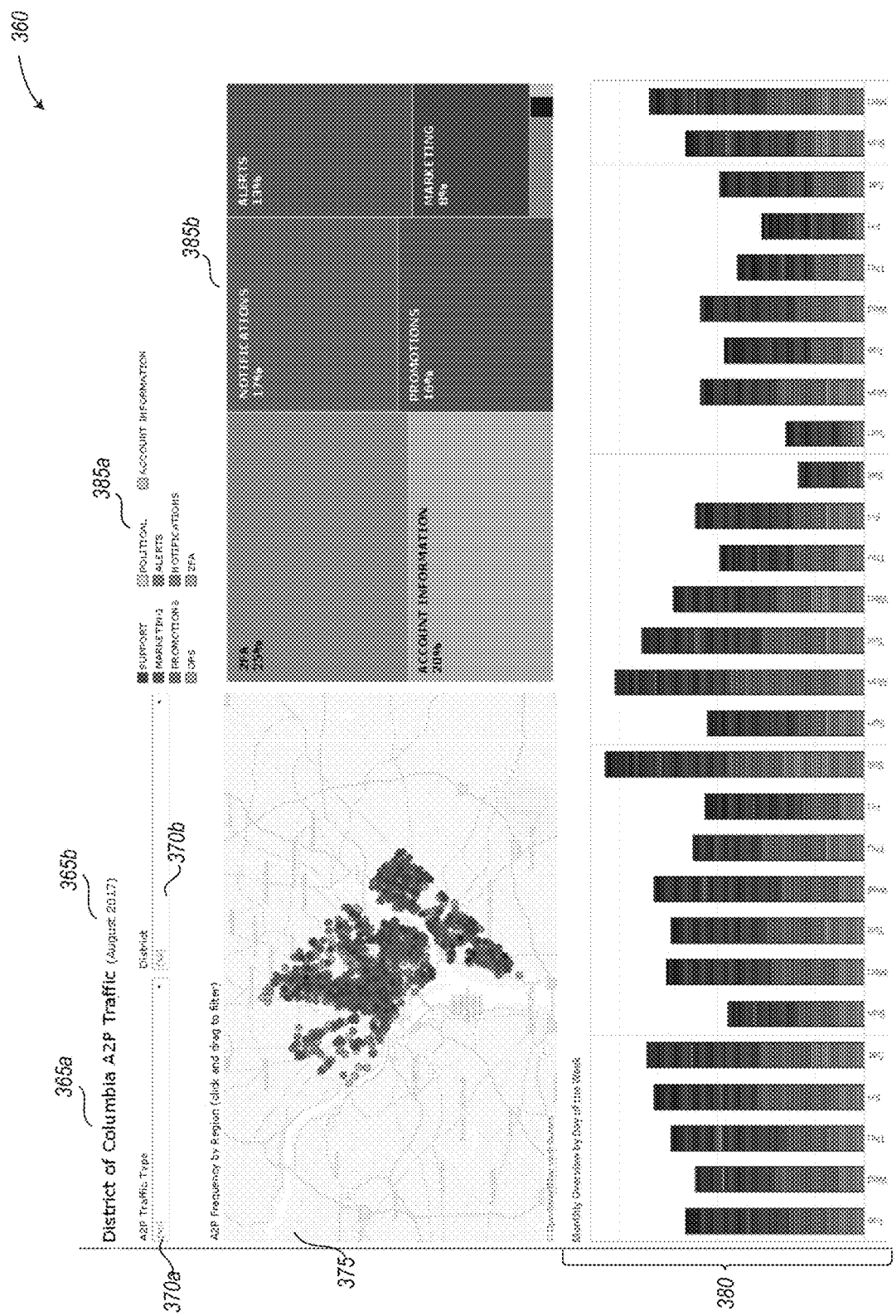

FIGS. 3A through 3D illustrate specific examples of additional information related to message analysis, such as may be provided and/or utilized by an embodiment of a Message Processing System (such as Message Processing System 110 of FIG. 1) in accordance with techniques described herein. In particular, FIG. 3A depicts information regarding a subset of identified message clusters; FIG. 3B depicts an example of messaging platform configuration information, such as may be utilized (with reference to FIG. 1) by policy manager 116 of the Message Processing System 110 in order to tag, prioritize, and/or filter messages analyzed by the Message Processing System and forwarded for delivery to a corresponding messaging platform 150. FIG. 3C depicts information regarding a subset of identified message clusters in a manner similar to that depicted in FIG. 3A, but with additional information regarding high-frequency message cluster routes based on message analytic operations performed by the Message Processing System. FIG. 3D illustrates an additional example of reporting various aspects of message analytic data generated by the Message Processing System.

With specific reference to FIG. 3A, a graphical user interface 300 is depicted (such as may be provided by the Message Processing System 110 via GUI manager 122 of FIG. 1) as presented to a user of the Message Processing System. In the depicted embodiment, the graphical user interface includes information presented in a tabular format regarding four distinct message clusters 302, 304, 306 and 308 identified by the Message Processing System as a result of analyzing various message characteristics, such as those associated with a number of incoming messaging platform messages. In particular, for each of the four identified message clusters the graphical user interface presents message volume information 310*a*, regarding a quantity of messages in each identified message cluster; origin message device identifier information 310*b*, regarding a quantity of sender message device identifier associated with messages of each identified message cluster; keyword information 310*c*, listing particular keywords that the Message Processing System has recognized as common to each message of the corresponding identified message cluster; and categorization controls 310*d*, indicating a message type and initial categorization performed by the Message Processing System as a result of analyzing the identified message cluster.

In this example, and with continued reference to FIG. 3A, identified message cluster 302 contains 9,048 individual messages (identified via message volume indicator 302*a*) that were sent by 1,875 individual sender message device identifiers (identified via message device identifier quantity indicator 302*b*). Each of the messages in cluster 302 includes a collection of common words 302*c* (which in the depicted example include all of "Please, Thank, appointment, at, call, confirming, for, questions, us, with, you, [and] your").

A category or "use case" listing 302*f* is depicted for identified message cluster 302, indicating potential categories currently in use for A2P messages identified by the Message Processing System. In the depicted embodiment, the potential categories include "Account/Password Confirmations"; "M2M" (for "Machine to Machine" Communications); "Account Information/Balance"; "Orders/Payments"; "Confirmations"; "Alerts"; "Customer Support"; "Notifications"; "Promotions"; "Marketing Campaigns"; and "Recruitment," with the "Customer Support" category being currently selected for identified message cluster 302.

It will be appreciated that the category listing 302*f* obscures certain additional user interface controls of GUI 300 for the identified message cluster 302, such as are analogously discussed below with respect to identified message clusters 304 and 306. It will further be appreciated that additional categories for A2P and other message types may be utilized by the Message Processing System in this and other embodiments, and that in other scenarios and embodiments, particular categories depicted in GUI 300 may be unavailable or unused.

In the depicted embodiment, additional information and selectable user interface controls are provided by the GUI 300. In particular, the depicted GUI 300 includes message cluster text callout 304*g* displays the text of one of the 5,594 individual messages of identified message cluster 304, such as may be displayed by the GUI 300 in response to one or more user interface actions (e.g., selecting or hovering over one or more fields of GUI 300 associated with the identified message cluster 304, etc.).

In addition, category control 304*e* allows the user to select or override a category identified by the Message Processing System with respect to the identified message cluster 304, such as to display and/or manually select a category listing similar to that shown above with respect to the identified message cluster 302. It will be appreciated that due to the disparate content of identified message cluster 304, categories utilized by the Message Processing System for the identified spam message cluster 304 likely differ from those utilized for the identified A2P message cluster 302. The GUI 300 further includes a message type identification control for each of the identified message clusters, as exemplified by message type identification control 306*d* (indicating that the message cluster has been identified as an "A2P" cluster) for identified message cluster 306. In at least the depicted embodiment, a user may manually select a message type to modify the classification of a cluster initially provided by the Message Processing System.

FIG. 3B depicts messaging platform configuration information 320 in tabular form, such as may be provided to a Message Processing System (such as Message Processing System 110 of FIG. 1) by a messaging platform associated with one of messaging platform s 150. In the depicted configuration information, Carrier A (i.e., an example of a messaging platform) has provided indications of nine separate categories for use with messages intended for recipients within its own messaging platform, although it will be appreciated that in various embodiments, fewer or additional such categories may be utilized by the Message Processing System for participating messaging platforms, message analytic data and reporting, internal use, or other purposes.

In the depicted embodiment, for each of the nine identified message categories or "message classes" 325a-i, the messaging platform configuration information includes Messaging platform (Owner) identifier 335a; message class identifier information 335b (such as may be used to tag messages identified as being associated with the corresponding category); message type information 335c; maximum message rate information 335d, indicating (in "MPM" or "messages per minute") a maximum volume rate (per originating message device identifier) of messages associated with that category to allow to be forwarded to the corresponding destination messaging platform; messaging platform vetting status information 335e, indicating whether messages associated with the corresponding category require review or other indicated vetting by the messaging platform associated with the destination messaging platform; sender anonymity class information 335f ("Sender ID Required"), indicating whether messages of the corresponding category may be transmitted anonymously (i.e., without identifying a sending message device identifier to the intended recipient of the message); messaging platform anonymity class information 335g ("Source ID Required"), indicating whether a sender message device identifier associated with messages of the corresponding category must be provided to the recipient messaging platform; shared class information 335h; class description information 335i, describing "Intended Uses" for the corresponding message category; and risk rating adjustment information 335j, indicating (in at least the depicted embodiment) a risk rating modifier to assign to senders of messages within identified message clusters of the corresponding category. In some embodiments, the risk rating adjustment information 335j may instead be a risk rating threshold that is assigned to the particular messaging platform, as discussed elsewhere herein.

Message category 325a, according to the messaging configuration information of FIG. 3B, has been assigned a message class identifier of "A", and corresponds to P2P communications that are allowed to be forwarded by the Message Processing System to the destination messaging platform at a maximum rate of 15 messages per minute. Class "A" is intended for "Peer To Peer" communications, requires no vetting by an indicated service provider or the corresponding messaging platform, and allows for anonymous-sender messaging. The category is associated with a "−1" risk rating adjustment, indicating that senders of messages within the identified category may receive an incremental decrease in their associated risk rating as a result of sending such messages.

Message category 325b has been assigned a message class identifier of "B", and corresponds to P2P communications that are allowed to be forwarded by the Message Processing System to the destination messaging platform at a maximum rate of 15 messages per minute. Class "B" is intended for authorized promotional communications, requires no review or alternative vetting by an indicated service provider or the corresponding messaging platform, and allows for anonymous-sender messaging but requires an originating message device identifier of the message to be provided to the destination messaging platform. A risk rating of "n/a" is to be assigned to messages of identified message clusters determined to be associated with the message category 325b, indicating no adjustment to the sender's risk rating is associated with messages of this category.

Message category 325c has been assigned a message class identifier of "C", and corresponds to A2P communications that are allowed to be forwarded by the Message Processing System to the destination messaging platform at a maximum rate of 50 messages per minute. Class "C" is intended for "Two-Factor Authentication" communications, requires no review or alternative vetting by an indicated service provider or the corresponding messaging platform, and does allows for anonymous-sender messaging. A risk rating of "−1" is to be assigned to messages of identified message clusters determined to be associated with the message category 325c.

Message category 325d has been assigned a message class identifier of "D", and corresponds to M2M communications that are allowed to be forwarded by the Message Processing System to the destination messaging platform at a maximum rate of 100 messages per minute. Class "D" is intended for "IoT Updates" communications, requires "Automated API" vetting by the corresponding messaging platform, and allows for anonymous-sender messaging but requires an originating message device identifier of the message to be provided to the destination messaging platform. A risk rating of "−1" is to be assigned to messages of identified message clusters determined to be associated with the message category 325d.

Message category 325e has been assigned a message class identifier of "E", and corresponds to "A2P" communications intended for "Enterprise campaign" uses, which are allowed to be forwarded by the Message Processing System to the destination messaging platform at a maximum rate of 10,000 messages per second (effectively removing any transmission rate throttling for messages identified as being associated with that category). Class "E" requires review or alternative vetting by an indicated service provider or the corresponding messaging platform, and allows for anonymous-sender messaging but requires an originating message device identifier of the message to be provided to the destination messaging platform. A risk rating of "n/a" is to be assigned to messages of identified message clusters determined to be associated with the message category 325e, indicating no adjustment to the sender's risk rating is associated with messages of this category.

Message category 325f has been assigned a message class identifier of "F", and corresponds to "A2P" communications intended for "Account/Password confirmation" uses, which are allowed to be forwarded by the Message Processing System to the destination messaging platform at a maximum rate of 100 messages per second. Class "F" requires no review or alternative vetting by an indicated service provider or the corresponding messaging platform, and allows for anonymous messaging. A risk rating of "n/a" is to be assigned to messages of identified message clusters determined to be associated with the message category 325e, indicating no adjustment to the sender's risk rating is associated with messages of this category.

Message category 325g has been assigned a message class identifier of "G", and corresponds to "P2P" communications intended for "Customer Support" use, which may be forwarded by the Message Processing System to the destination messaging platform at a maximum rate of 50 messages per second. Class "G" requires no review or alternative vetting by an indicated service provider or the corresponding messaging platform, and allows for anonymous-sender messaging but requires originating message device identifier of the message to be provided to the destination messaging platform. A risk rating of "−1" is to be assigned to messages of identified message clusters determined to be associated with the message category.

Message category 325h has been assigned a message class identifier of "H", and corresponds to "P2P" communications identified as unauthorized promotional messages, which may be forwarded by the Message Processing System to the destination messaging platform at a maximum rate of 5 messages per second. Class "H" requires no review or alternative vetting by an indicated service provider or the corresponding messaging platform, and allows for anonymous-sender messaging. A risk rating of "+3" is to be assigned to messages of identified message clusters determined to be associated with the message category, indicating a disfavored category that is associated with an increase to an associated sender's risk rating within the destination messaging platform.

Message category 325i has been assigned a message class identifier of "I", and corresponds to "P2P" communications identified as phishing messages. As indicated by the maximum rate of transmission of "0," such messages are not to be delivered to the intended recipient (although in various configurations and embodiments, they may be provided to the destination messaging platform). Messages of Class "H" require do not require vetting by an indicated service provider or the corresponding messaging platform, but do not allow for anonymous-sender messaging. A risk rating of "+9" is to be assigned to messages of identified message clusters determined to be associated with the message category, indicating a heavily disfavored category that is associated with an large increase to an associated sender's risk rating within the destination messaging platform.

It will be appreciated that the message categories discussed in the description above with respect to FIG. 3B are only examples, and that the Message Processing System allows in various embodiments for countless configuration possibilities for identifying and acting on message categories of varying granularity and scope. Moreover, although the message categories 225a-225i are illustrated as having an associated risk rating adjustment, the categories may be alternatively associated with a risk rating threshold (e.g., a value between 0 and 100 or between 0 and 1), which may indicate whether messages associated with that category are spam, to be watched, or some other designation, as discussed elsewhere herein.

FIG. 3C depicts information regarding a subset of identified message clusters in a manner similar to that depicted in FIG. 3A, but with additional information regarding high-frequency message cluster routes based on message analytic operations performed by the Message Processing System. In particular, FIG. 3C depicts a GUI 340 that includes information presented in a tabular format regarding two distinct message clusters 342 and 344. In a manner similar to that described above with respect to FIG. 3A, the GUI 340 includes message volume information 310a, origin message device identifier information 310b, and keyword information 310c, respectively regarding a quantity of messages in each identified message cluster, a quantity of sender message device identifiers associated with messages of each identified message cluster, and particular keywords that the Message Processing System is recognized as common to each message of the corresponding identified message cluster.

Also in a manner similar to that described above with respect to FIG. 3A, the GUI 340 includes categorization controls 310d, indicating a message type and initial categorization performed by the Message Processing System as a result of analyzing the identified message cluster (which in the depicted embodiment indicate that both of the depicted identified message clusters 342 and 344 have been identified by the Message Processing System as spam). GUI 340 further includes volume routing information 350, and in particular provides origin network information 350a, destination network information 350b, and message quantity information 350c with respect to the message routes having the highest message volume with respect to the two identified message clusters 342 and 344. With respect to identified message cluster 342, for example, all messages of the identified message cluster were sent from an origin network of "Twilio USA," with increasing volumes of messages from the cluster being sent to "Cellular South/Telepak—USA," "US Cellular—USA," "Sprint PCS—USA," "AT&T MOBILITY," and "T-Mobile—USA," respectively.

FIG. 3D illustrates an example of a GUI 360 presenting various aspects of message analytic data generated by a Message Processing System (such as Message Processing System 110, with reference to FIG. 1), such as may be displayed in response to user interactions by a user associated with an operator of one of messaging platforms 150 and provided by the Message Processing System (e.g., via reporting manager 118). In the depicted embodiment, the GUI 260 presents message analytic traffic data regarding a subset of data processed by the Message Processing System for a specified geographic region during a specified period of time.

In particular, the GUI 360 includes dataset specification identifiers 365a and 365b, indicating that the particular data being presented by the Message Processing System is for A2P message traffic within the District of Columbia during August 2017; dataset specification controls 370a and 370b, allowing the user to specify a different subset of data for viewing by selecting a different message type or geographic region, respectively; regional message volume display 375, providing a geographical mapping of message volume for the selected dataset; time period overview display 380, which includes a bar graph displaying categorized message volume for each day within the specified time period, and proportional overview display 385, which displays a proportional distribution of message traffic for the specified dataset according to identified message categories. The proportional overview display includes category key 385a, providing a legend for the categories identified by the Message Processing System for the specified dataset and depicted within the proportional overview display; and the proportional overview grid 385b, indicating that 25% of the dataset was identified as two-factor authentication ("2FA") messages, 20% of the dataset was identified as account information messages, 17% of the dataset was identified as notification messages, 16% of the dataset was identified as promotional messages, 13% of the dataset was identified as alert messages, and 8% of the dataset was identified as marketing messages, with various lesser quantities of categorized messages for the dataset being graphically depicted but not textually labeled.

It will be appreciated that the elements of GUI 360 discussed in the description above and depicted in FIG. 3D are only examples, and that the Message Processing System allows in various embodiments for countless configuration possibilities for both generating message analytic data and providing a graphical or other displays of such data, including via alternative graphical user interfaces, via one or more textual user interfaces, and/or via one or more programmatic interfaces (such as API 120 of FIG. 1). Additional examples of message analytic data that may be generated and reported by the Message Processing System with respect to message volume, message clustering, message categorization, message characteristics, sender history and characteristics, and other aspects of communication traffic analyzed by the Message Processing System in various embodiments are provided elsewhere herein.

In addition, in various embodiments the Message Processing System may provide additional functionality regarding user inquiry and reporting, such as to enable various user interactions with clusters of similar messaging content; to enable user designation or modification of one or more categories associated with an identified message cluster by the Message Processing System, including identified message clusters that incorporate messages to or from multiple messaging platforms; to enable user viewing and modification of characteristics associated with particular message device identifiers; etc.

Figure 4B:
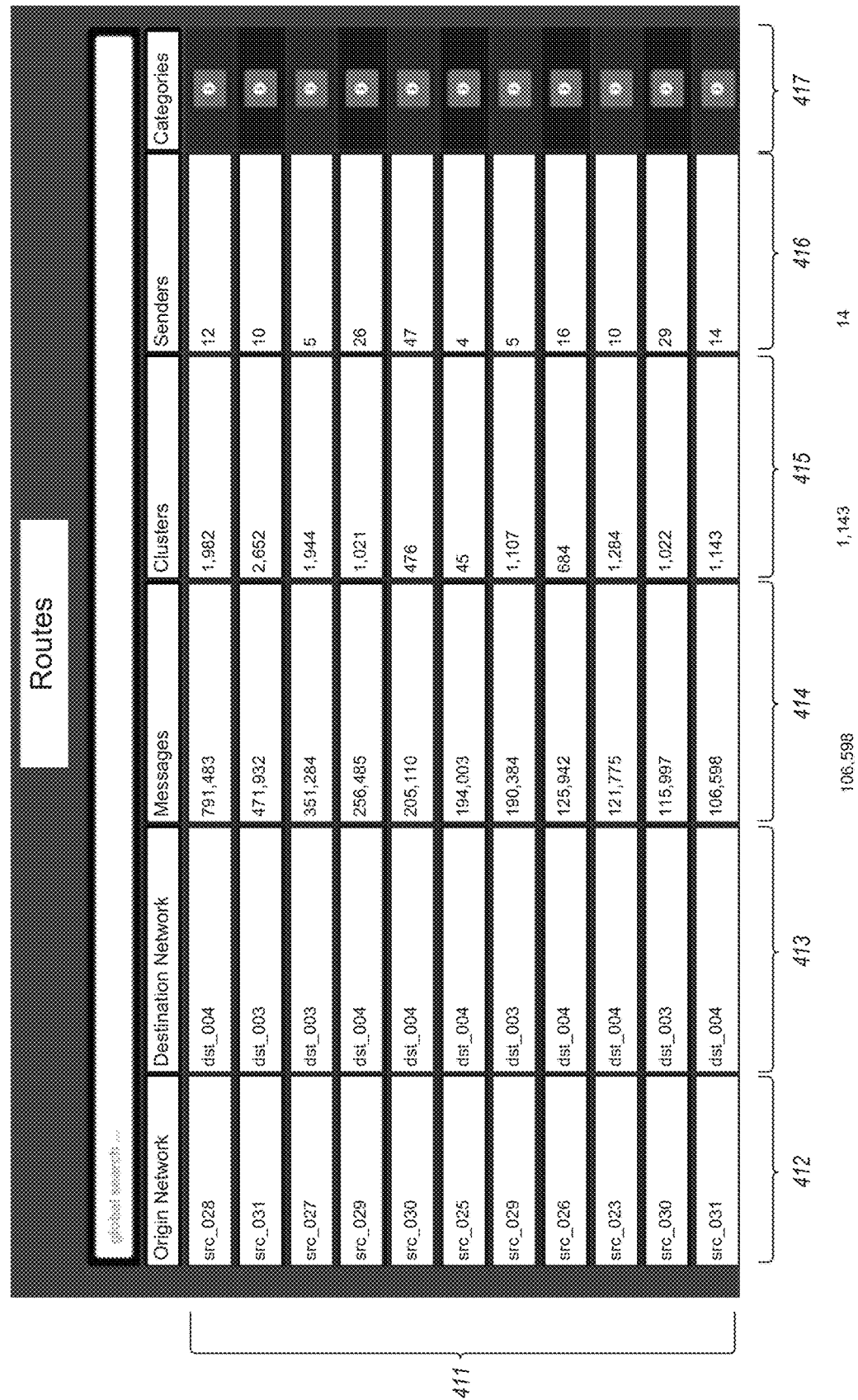
Figure 4C:
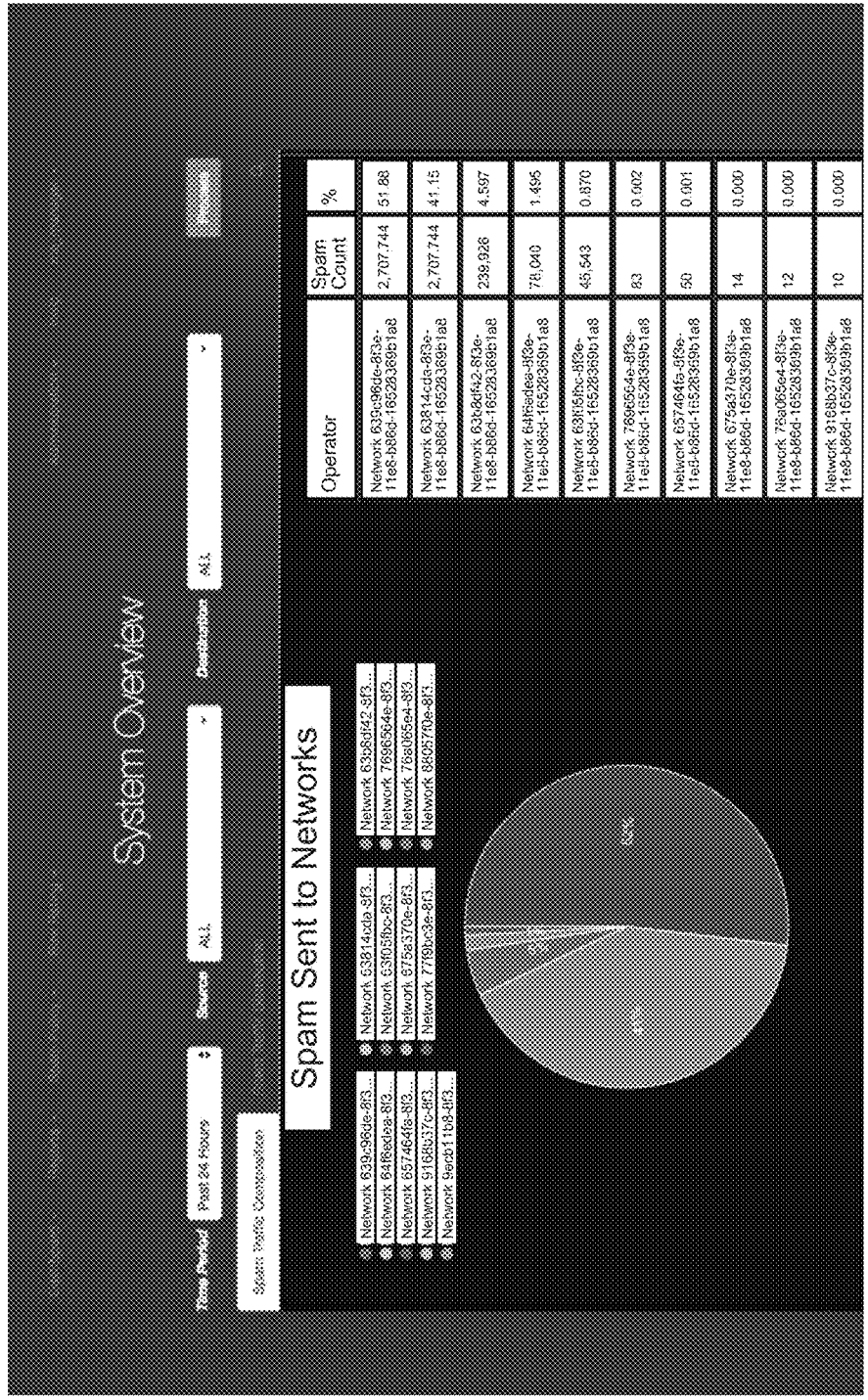
Figure 4D:
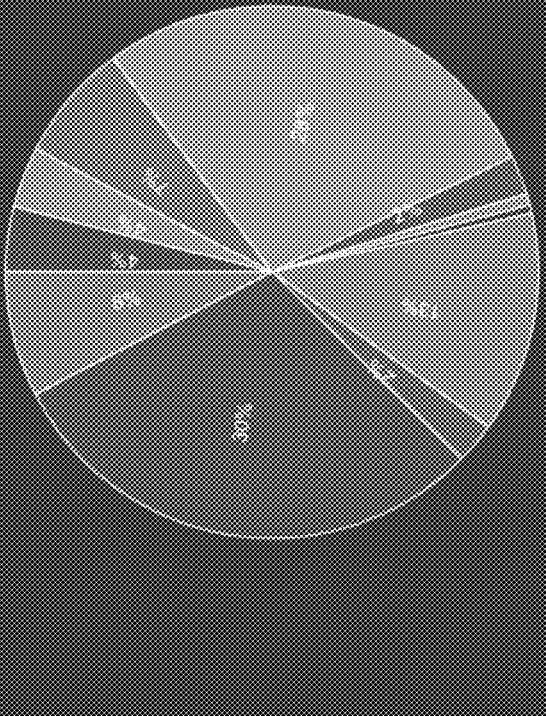
Figure 4E:
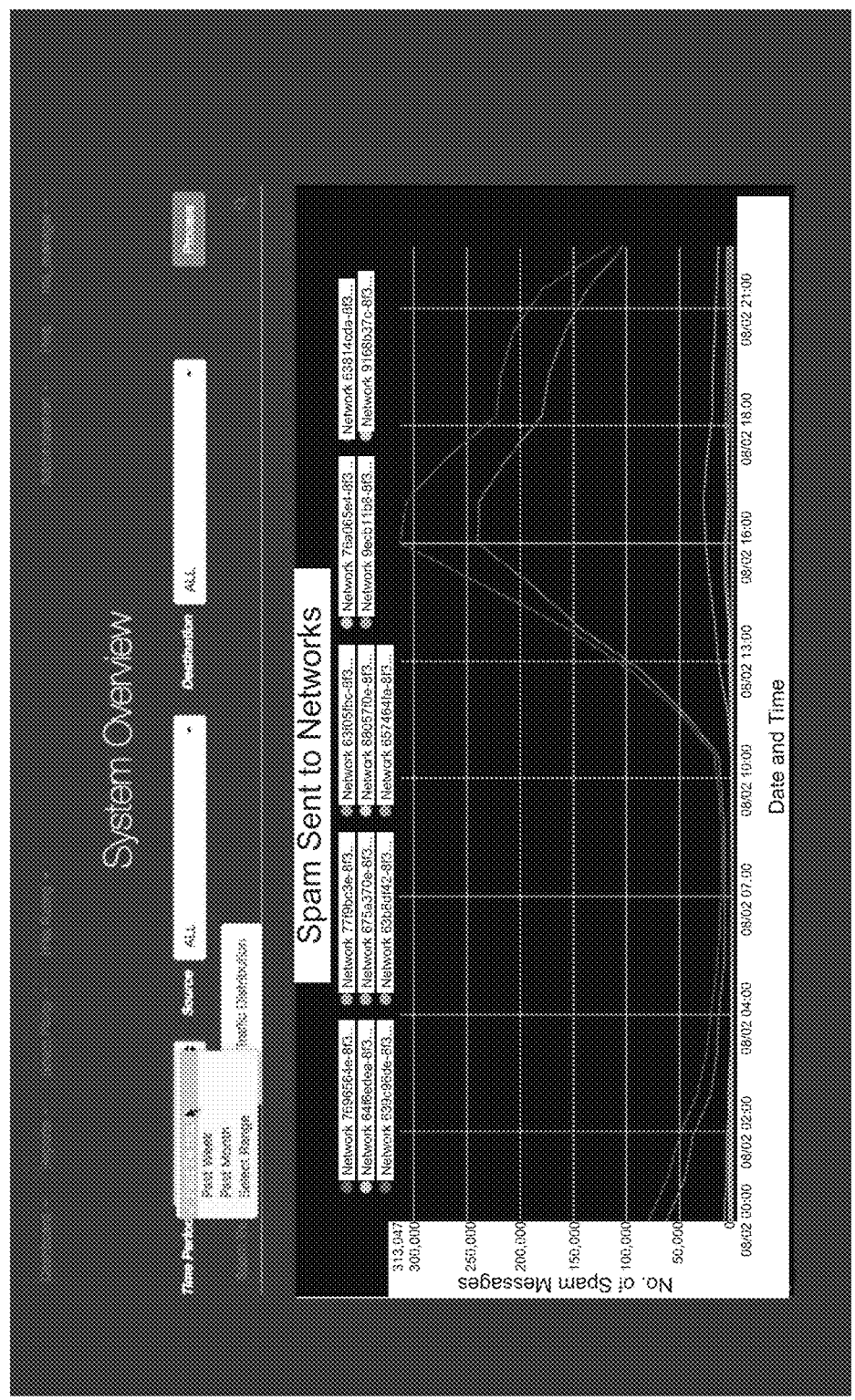
Figure 4F:
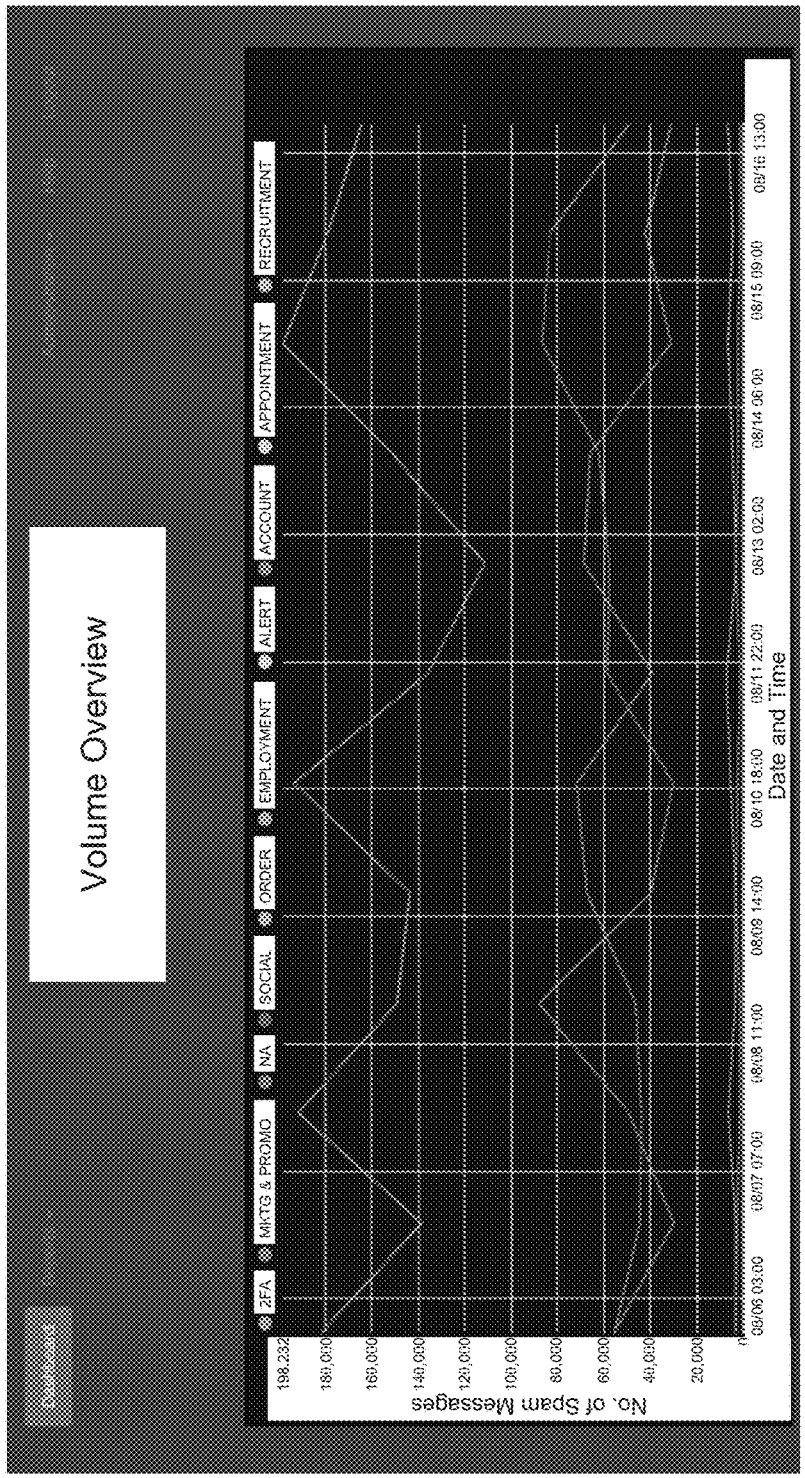
Figure 4J:
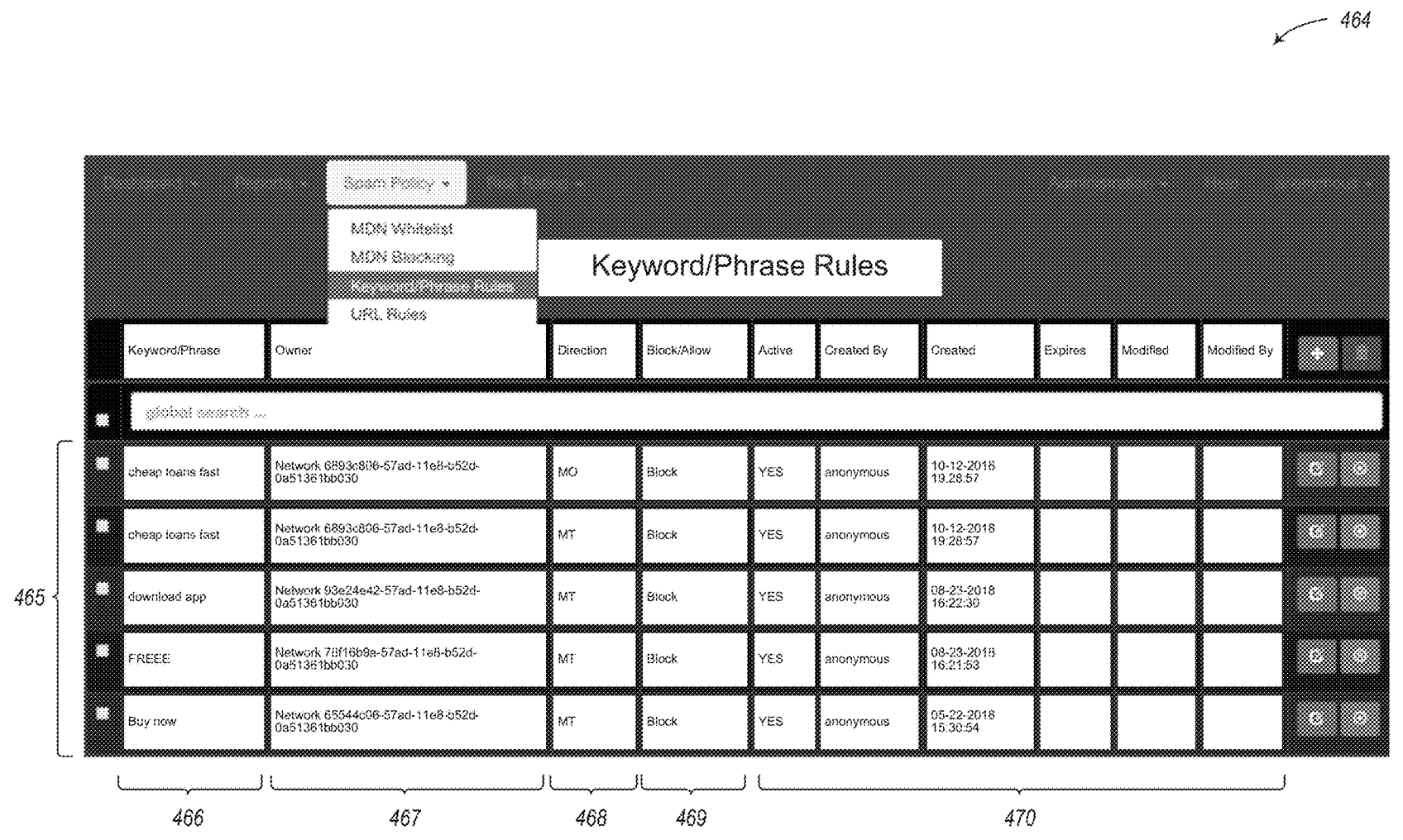
Figure 4K:
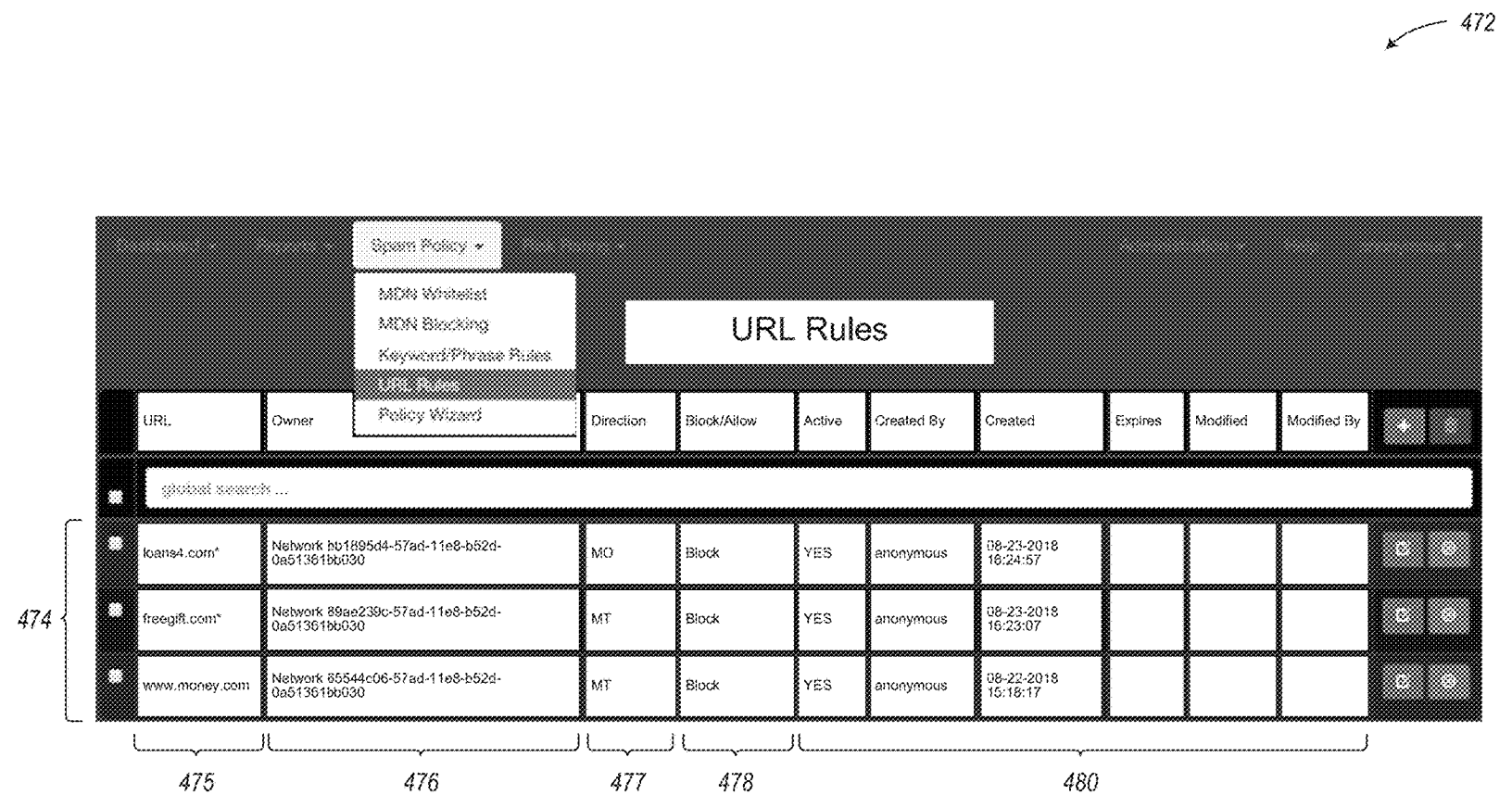

FIGS. 4A through 4K illustrate additional examples of particular information related to message analysis, such as may be generated, provided, or utilized by an embodiment of a Message Processing System (such as Message Processing System 110 of FIG. 1) in accordance with techniques described herein. In particular, FIG. 4A depicts information regarding a subset of identified message clusters; FIG. 4B depicts information regarding route analysis from originating messaging platforms to destination messaging platforms; FIG. 4C depicts information regarding overview information of originating messaging platforms; FIG. 4D depicts information regarding overview information of originating message categories; FIG. 4E depicts information regarding message traffic volumes over time for different messaging platforms; FIG. 4F depicts information regarding message traffic volumes over time for different message categories; FIG. 4G depicts information regarding originating messaging platform traffic; FIG. 4H depicts information regarding message traffic for originating devices; FIG. 4I depicts information regarding risk rating thresholds for originating devices; FIG. 4J depicts information regarding keyword/phrase rules; and FIG. 4K depicts information regarding URL rules.

With specific reference to FIG. 4A, a graphical user interface 400 is depicted (such as may be provided by the Message Processing System 110 via GUI manager 122 of FIG. 1) as presented to a user of the Message Processing System. In the depicted embodiment, the graphical user interface includes information presented in a tabular format similar to graphical user interface 300 in FIG. 3A. Graphical user interface 400 includes a plurality of message clusters 401*a*-402*b*. For each message cluster 401, the graphical user interface presents a volume 402, number of senders 403, common words 404, sample message 405, origin messaging platforms 406, destination messaging platforms 407, volume per route 408, and classification 409.

The volume 402 includes the total number of messages that that been processes by the Message Processing System that are associated with that particular message cluster 401, such as over a selected amount of time. The number of senders 403 provides the total number of originating message device identifiers that are sending messages associated with the message cluster during a selected time period. The common words 404 identifies the words that the Message Processing System identifies as being common in messages associated with that particular cluster. The sample message 405 is a random selection of a messages associated with the message cluster. In some embodiments, some information may be removed or tokenized to hide personal information. The origin messaging platforms 406 provides information regarding one or more originating messaging platforms of the messages associated with the cluster. In various embodiments, one or many (e.g., all or a highest x number) originating messaging platforms may be shown. The destination messaging platforms 407 provides information regarding one or more corresponding destination messaging platforms of the messages associated with the cluster with respect to the originating messaging platforms 406. In various embodiments, one or many (e.g., all or a highest x number) destination messaging platforms may be shown. The volume per route 408 identifies the number of messages in a message cluster that have a same route from an originating messaging platform 406 to a destination messaging platform 407. The classification 409 identifies the particular classification of messages associated with that message cluster, such as HAM (not spam), spam, or some other classification (e.g., as illustrated by category listing 302*f* in FIG. 3A.

FIG. 4B depicts a graphical user interface 410 that includes information regarding route analysis from originating messaging platforms to destination messaging platforms. For example, graphical user interface 410 lists a plurality of routes 411 from an originating messaging platform 412 to a destination messaging platform 413. Each route 411 also includes a number of messages 414 associated with the corresponding route between the originating messaging platform 412 and destination messaging platform 413. The graphical user interface 410 also shows the number of clusters 415, the number of senders 416, and associated categories 417. The number of clusters 415 shows the number of clusters associated with messages for a particular route. The number of senders 416 identifies the number of message device identifiers that are sending messages along a given route for a select amount of time. The categories 417, as shown, includes a graphical button that can be selected by a user to view the details of the different categories determined for each respective route 411. In some embodiments, the categories 417 may list the associated categories without the additional graphical button. The information presented in the graphical user interface 410 allows a user to see if there are particular routes that are associated in very few clusters or very few senders, but that have a very high volume, which could indicate spam messages.

FIG. 4C depicts a graphical user interface 418 that presents additional overview information of originating messaging platforms. In particular, graphical user interface 418 identifies a list of originating messaging platforms 420 and the number of messages identifies as spam 421 for each originating messaging platform. The graphical user interface 418 also includes a percentage 422 of messages that are spam messages 421 from each originating messaging platform 420 with respect to a total number of spam messages, which is also illustrated by graphic 419. In various embodiments, these information may be presented for a select time period, such as 10 minutes, one hour, or 24 hours (as shown). This interface can provide users with a general idea of which originating messaging platforms are providing the largest numbers of spam messages.

FIG. 4D depicts a graphical user interface 424 that presents additional overview information of message categories. In particular, graphical user interface 424 identifies a list of categories 426 and the number of messages 427 identifies as that respective category 426. The graphical user interface 424 also includes a percentage 428 of messages 427 that are associated with each category 426 with respect to a total number of messages, which is also illustrated by graphic 425. In various embodiments, these information may be presented for a select time period, such as 10 minutes, one hour, or 24 hours (as shown). This interface can provide users with a general idea of which categories a group of messages are associated.

FIG. 4E depicts a graphical user interface 430 for illustrating a volume of spam messages 431 over time 432 sent by originating messaging platforms 433. This interface can provide users with a general idea of when spam messages are being sent from particular messaging platforms, which can further guide when a message may be categorized as spam or some other category.

FIG. 4F depicts a graphical user interface 434 for illustrating a volume of messages 435 over time 436 that are associated with various categories 437. This interface can provide users with a general idea of when messages associated with different categories are being sent, which can further guide when a message may be categorized as spam or some other category.

FIG. 4G depicts a graphical user interface 438 for illustrating additional information regarding originating messaging platform traffic. For example, graphical user interface 438 lists a plurality of originating messaging platforms 440 and the total number of messages 441 originating from that platform. The graphical user interface 438 also includes a number of clusters 442 and a number of senders 443. The number of clusters 442 displays the number of unique clusters that have been identified in the messages 441. And the number of senders 443 displays the number of unique senders that are originating the messages 441 from that particular originating messaging platform 440. The graphical user interface 438 also lists the respective destination messaging platforms 444 for the messages 441 of the respective originating messaging platforms 440. For each respective destination messaging platform 444, the graphical user interface 438 also displays the respective number of messages 445, the number of clusters 446 for those messages 445, and the number of senders 447 originating messages 445. This interface can provide users with a general idea of how varied the messages are from a particular originating messaging platform to different destination platforms, which can further guide which originating networks may be prone to the origination of spam messages.

FIG. 4H depicts a graphical user interface 448 that presents information regarding message traffic for originating devices. The graphical user interface 448 lists a plurality of originating devices 449 by their message device identifier 450. The graphical user interface 448 also illustrates the number of messages 451 that originate from each originating device 449 and from what messaging platform 452. Moreover, the number of clusters 453 in which the messages 451 are associated is also shown. This interface can provide users with a general idea of how varied the messages are from a particular originating device, which can further guide which originating devices may be sending spam messages.

FIG. 4I depicts a graphical user interface 448 that illustrates risk rating thresholds 458 for a plurality of entities 455. Each entity 455 is represented by an identifier 456. In some embodiments, the entities 455 may be originating messaging platforms, originating messaging devices, or other entities that may have a calculated risk rating threshold 458. In various embodiments, the graphical user interface 448 also identifies how that risk rating threshold 458 is categorized 457, such as whether it has exceeded a spam threshold, suspect threshold, or some other threshold. The graphical user interface 454 may also provide other information, such as a creation author 459, a creation time 460, a last modified time 461, and a modification author 462. The creation author 459 identifies who calculated or assigned an initial risk rating threshold 458 to the entities 455, and the creation time 460 indicates when the risk rating threshold 458 was created. The last modified time 461 indicates when the risk rating threshold 458 was last modified, and the modification author 462 indicates who modified the risk rating threshold 458. In various embodiments, the risk rating threshold 458 for a particular entity 455 may be created for modified by the system itself (such as when it is analyzing messages associated with a particular entity 455), a manager, a user, or some other administrator. This interface can provide users with a general idea of which entities are spammers, which entities are identified as suspect, and which entities are non-problematic.

FIG. 4J depicts a graphical user interface 464 that allows a user to create or modify rules 465, and in particular keyword/phrase rules. The rules 465 are identified by a word/phrase 466, a corresponding entity 467, and a direction 468. The word/phrase 466 identifies the message content that is search for, and if found a corresponding action 469 is performed. The corresponding entity 467 may be an originating or destination messaging platform or an originating or destination device, and the direction may indicate whether the rule applies to messages coming from the entity 467 or going to the entity 467. The graphical user interface 464 also identifies the type of action 469 to take, such as to block or allow. The graphical user interface 464 may also include other information 470, such as whether the rule is currently active, the author of the rule, when it is to expire, etc. This interface can provide users with an ability to create rules to block or allow particular types of content for particular entities based on words or phrases.

FIG. 4K depicts a graphical user interface 472 that allows a user to create or modify rules 474, and in particular URL rules. The rules 474 are identified by a URL 475, a corresponding entity 476, and a direction 477. The URL 475 identifies the message content that is search for, and if found a corresponding action 478 is performed. The corresponding entity 476 may be an originating or destination messaging platform or an originating or destination device, and the direction may indicate whether the rule applies to messages coming from the entity 476 or going to the entity 476. The graphical user interface 472 also identifies the type of action 478 to take, such as to block or allow. The graphical user interface 472 may also include other information 480, such as whether the rule is currently active, the author of the rule, when it is to expire, etc. This interface can provide users with an ability to create rules to block or allow particular types of content for particular entities based on particular URL or portions of URLs.

In some embodiments, various types of information presented in the above illustrative examples may be presented with actual identifiers or anonymized, such as the name of the originating messaging platform, the destination messaging platform, the senders messaging device identifier, etc.

Figure 5A:
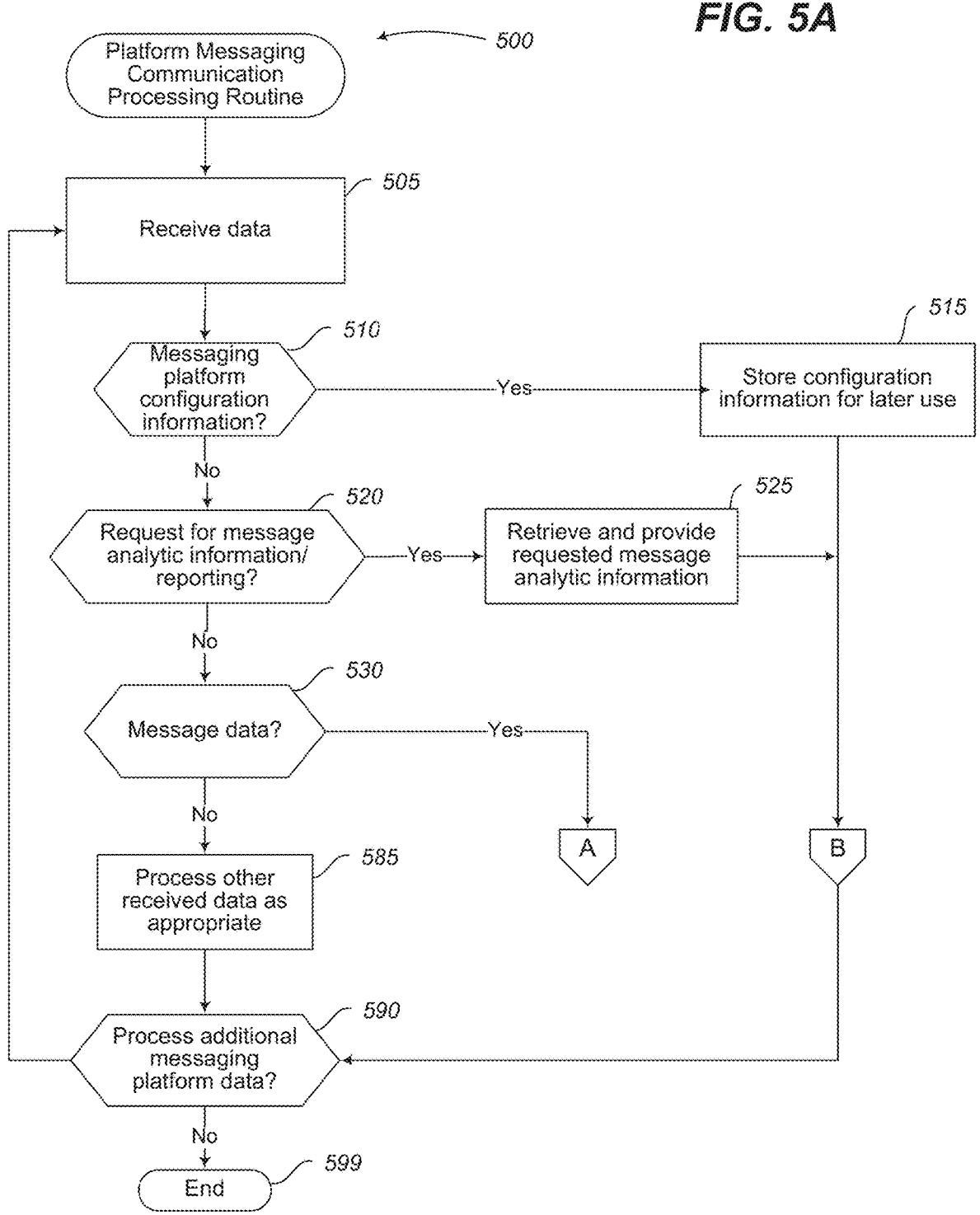
FIGS. 5A-5B provide block diagrams illustrating an overview of certain operations performed by an embodiment of a Message Processing System in accordance with techniques described herein.
Figure 5B:
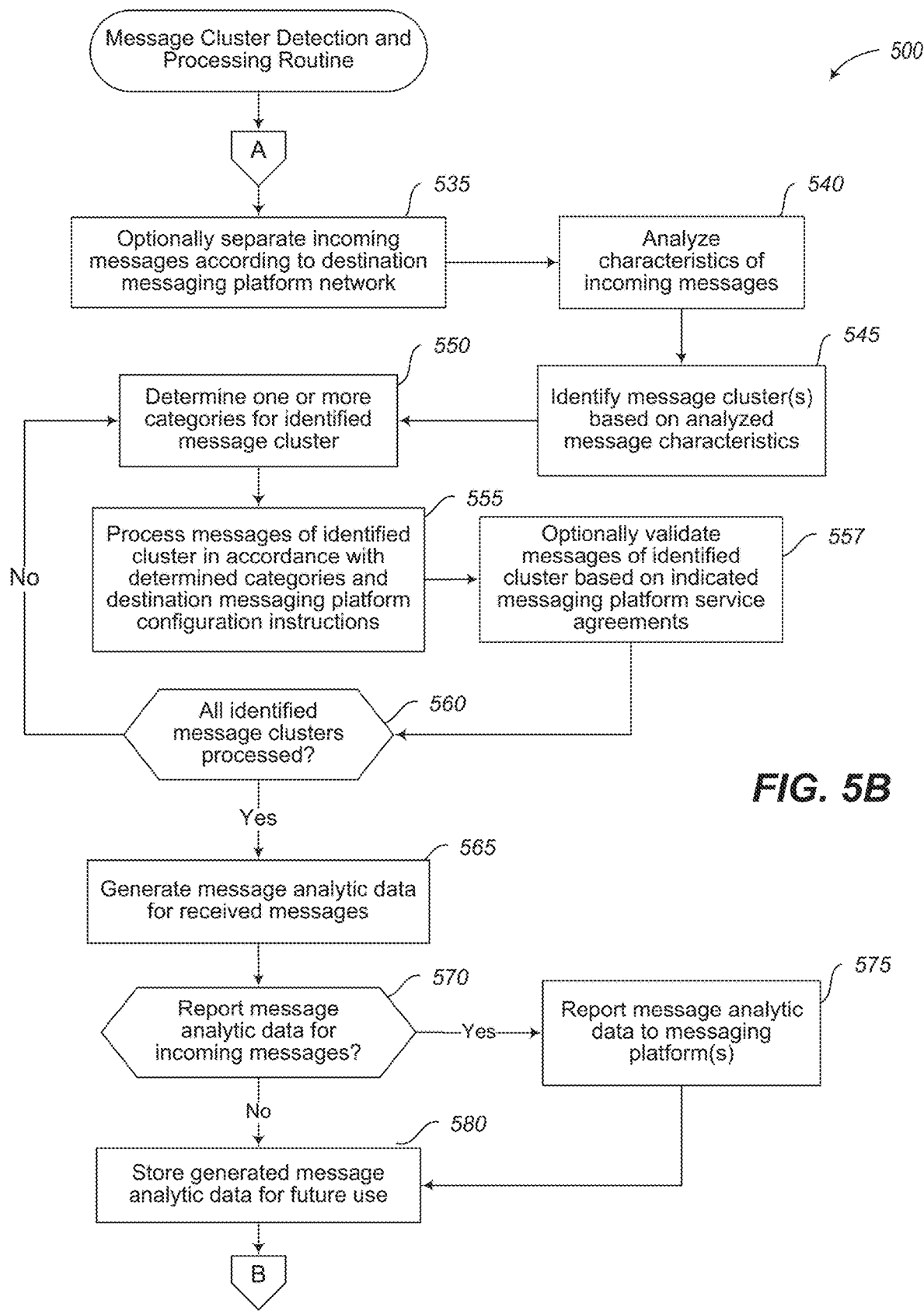
Figure 6:
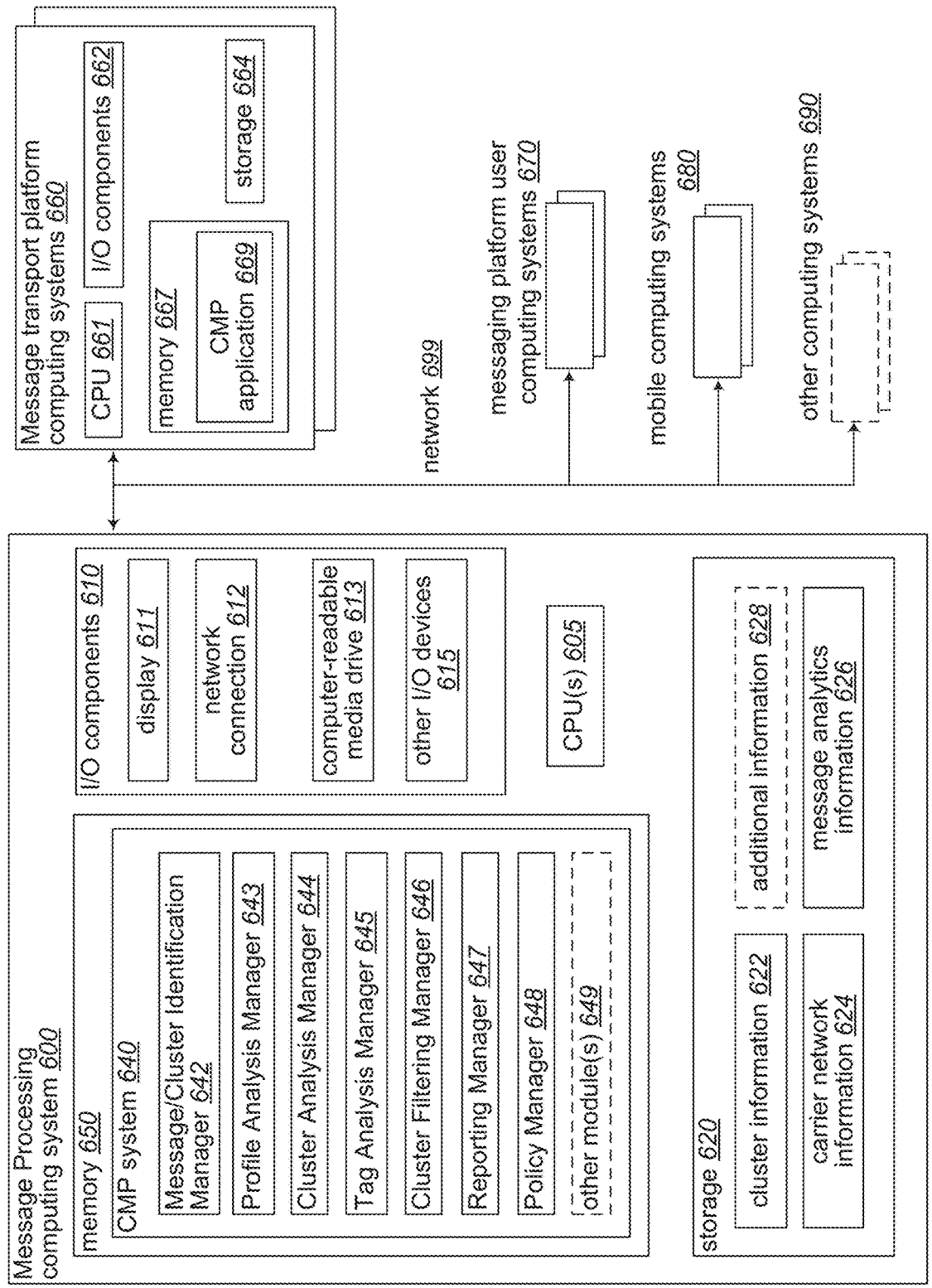
FIG. 6 is a block diagram illustrating a server computing system suitable for executing an embodiment of a Message Processing System that performs at least some techniques described herein.

FIGS. 5A-5B illustrate an overview of a platform messaging communication processing routine 500 performed by an embodiment of a Message Processing System in accordance with techniques described herein. The routine 500 may, for example, be performed by CPU(s) 605 as part of executing Message Processing System 640 (as depicted in FIG. 6), or by the Message Processing System 110 of FIG. 1.

The routine 500 of FIG. 5 begins at block 505, in which a processor-based device receives data from a user of the Message Processing System. The received data may include messaging platform configuration information, a request for message analytics or reporting, messages (e.g., via message transport platform 125 of FIG. 1 or message transport platform computing systems 660 of FIG. 6), or some other data. At block 510, a processor-based device determines whether the received data includes user-specific configuration information, which may include information regarding a specific messaging platform. If so, the routine 500 proceeds to block 515, in which a processor-based device (such as via policy manager 116 of FIG. 1 or the policy manager component 648 of FIG. 6) stores the user-specific configuration information for later use (such as via storage components 130 of FIG. 1 or storage 620 of FIG. 6). In certain embodiments, storing the user-specific configuration information may further include validating (again, such as via a policy manager of the Message Processing System) the received user-specific configuration information, such as to check the configuration information for errors, to verify that parameters specified by the configuration information are compatible with one or more messaging platforms and/or the message transport platform, etc.

If in block 510 it was determined that the received messaging platform data did not include user-specific configuration information (or if the received configuration information has already been processed by the Message Processing System), the routine 500 proceeds to block 520, in which a processor-based device determines whether the received data includes a request for message analytic information or other reporting described in greater detail elsewhere herein. Such a request may have been received from an authorized agent of a messaging platform, of the message transport platform, or other authorized agent. If it is determined that the received data includes such a request, the routine 500 proceeds to block 525, in which a processor-based device retrieves and provides the requested message analytic information in response to the request in a graphical user interface (such as via the reporting manager 118 of FIG. 1 or the reporting manager component 647 of FIG. 6).

If in block 520 it was determined that the received data did not include a request for message analytic information or other reporting (or if the received request has already been processed by the Message Processing System), the routine 500 proceeds to block 530, in which a processor-based device determines whether the received data includes one or more incoming messages for analysis and categorization. If so, the routine 500 proceeds to block 535 (with reference to FIG. 5B), in which a processor-based device optionally separates the incoming messages according to their respective destination messaging platforms, as discussed in greater detail elsewhere herein.

With continuing reference to FIG. 5B, following block 535 the routine 500 proceeds to block 540, in which a processor-based device analyzes message characteristics for the received incoming messages. Examples of such message characteristics are discussed elsewhere herein. In block 545, a processor-based device identifies (such as via the cluster identification manager 112 of FIG. 1 or the cluster identification manager component 642 of FIG. 6) one or more message clusters based on the analyzing of the message characteristics performed in block 540, such as clusters that are similar with respect to their contents and other message characteristics. As described in greater detail elsewhere herein, in certain embodiments the identification of such message clusters may include comparison to stored historical data regarding other message clusters previously identified, machine learning, natural language processing, heuristic analysis, random forest algorithms, Bayesian or other statistical analysis, etc.

The routine 500 proceeds to block 550, in which a processor-based device determines (such as via cluster analysis manager 114 of FIG. 1 or the cluster analysis manager component 644 of FIG. 6) one or more appropriate categories for a message cluster identified in block 545. As with the identification of the message clusters in block 545, in various embodiments the categorization of each message cluster may include historical comparison, machine learning, natural language processing, heuristic analysis, random forest algorithms, Bayesian analysis, and other techniques. In certain embodiments, such categorization of an identified message cluster may also be based on user-specific configuration information, such as may have been previously provided by one or more of an originating messaging platform, destination messaging platform, or another entity associated with the transmission of one or more messages of the identified message cluster. Furthermore, in certain embodiments other received incoming messages not contained within any other identified message cluster (such as unique P2P communications) may be treated as a separate identified message cluster and categorized as such, such that the identified message cluster contains dissimilar messages with respect to contents and/or other message characteristics, but may be processed collectively in a similar manner by the Message Processing System.

In block 555, a processor-based device processes (such as via policy manager 116 of FIG. 1 or the policy manager component 648 of FIG. 6) the messages of the identified message cluster in accordance with the categories determined in block 550, as well as with stored user-specific configuration information related to a respective messaging platform for each of the messages in the identified message cluster. As described elsewhere herein, the processing of the messages of the identified message cluster may include, as non-limiting examples: tagging, such as to associate a message with an identifier associated with one or more categories, or to modify such a message to include that identifier; prioritization, such as to prioritize delivery of an identified message cluster associated with one category over another identified message cluster associated with one or more other categories; filtering, such as to modify, prevent or delay delivery of particular categories of identified message clusters. In addition, and as discussed in greater detail elsewhere herein, such processing may include taking one or more additional actions, either with respect to messages of an identified message cluster or with respect to one or more parties associated with the identified message cluster, such as modifying a risk rating or other status associated with such parties.

The routine 500 proceeds to block 557, in which a processor-based device optionally validates messages of the identified message cluster based on one or more indicated messaging platform service agreements, as described in greater detail elsewhere herein.

In block 560, a processor-based device determines whether all of the identified message clusters have been processed. If not, the routine 500 returns to block 550, in order to categorize and process an additional identified message cluster. However, if it is determined in block 560 that all of the identified message clusters have been processed, the routine 500 proceeds to block 565, in which a processor-based device generates message analytic data for the received incoming messages (such as via cluster analysis manager 114 of FIG. 1 or the cluster analysis manager component 644 of FIG. 6). The routine 500 then proceeds to block 570, in which a processor-based device determines whether the generated message analytic data for the received incoming messages is to be reported, such as in accordance with user-specific configuration data indicating that message analytic data is to be provided to a user. Such reporting may occur as soon as the message analytic data is generated, as soon as such message analytic data is generated for a predefined threshold quantity of messages, at periodic or other predefined time intervals, or in some other manner. If the generated message analytic data is to be reported, the routine 500 proceeds to block 575 to provide the generated message analytic data (such as via reporting manager 118 of FIG. 1 or the reporting manager component 647 of FIG. 6) to the user, which may be a particular messaging platform, a group of messaging platforms, an aggregator, or some other entity. Following either block 570 or 575, the routine 500 proceeds to block 580, in which a processor-based device stores the generated message analytic data for future use.

Returning to FIG. 5A, if it was determined in block 530 that the received data did not include one or more incoming messages for analysis and categorization (or if such incoming messages have already been processed by the Message Processing System), the routine 500 proceeds to block 585, in which a processor-based device processes other data received via the message transport platform as appropriate.

Following blocks 515, 525, 580 or 585, the routine 500 proceeds to block 590 to determine whether to process additional data, such as in response to an explicit indication to terminate. If it is to continue to process additional messaging platform data, control returns to block 505 to await additional messaging platform data; otherwise, the routine 500 proceeds to step 599 and ends.

FIG. 6 is a block diagram illustrating an embodiment of a server computing system 600 executing an implementation of a Message Processing System 640. The server computing system 600 and Message Processing System 640 may be implemented using a plurality of circuits that, when in combined operation, are suitable for performing and configured to perform at least some of the techniques described herein. In the illustrated embodiment, the server computing system 600 includes one or more hardware central processing units ("CPU") or other processors 605, various input/output ("I/O") components 610, storage 620, and non-transitory memory 650, with the illustrated I/O components including a display 611, a network connection 612, a computer-readable media drive 613, and other I/O devices 615 (e.g., keyboards, mice or other pointing devices, microphones, speakers, GPS receivers, etc.). The server computing system 600 and Message Processing System 640 may communicate via one or more networks 699 (e.g., the Internet, one or more cellular telephone networks, etc.) with other computing systems, such as message transport platform computing systems 660, messaging platform user computing systems 670, mobile computing systems 680, and other computing systems 690. Some or all of the other computing systems may similarly include some or all of the types of components illustrated for server computing system 600 (e.g., to have a Message Processing System client application 669 executing in non-transitory memory 667 of a message transport platform computing system 660 in a manner analogous to Message Processing System 640 in non-transitory memory 650).

In the illustrated embodiment, an embodiment of the Message Processing System 640 executes in memory 650 in order to perform at least some of the described techniques, such as by using the processor(s) 605 to execute software instructions of the Message Processing System in a manner that configures the processor(s) 605 and computing system 600 to perform automated operations that implement those described techniques. As part of such automated operations, the Message Processing System 640 and/or other optional programs or modules 649 executing in non-transitory memory 650 may store and/or retrieve various types of data, including in the example database data structures of storage 620.

In this example, the data used may include various types of message cluster information in database ("DB") 622, various types of messaging platform information in DB 624, various types of message analytics information in DB 626, and/or various types of additional information 628, such as various delivery or statistical information. The illustrated embodiment of the Message Processing System 640 includes cluster identification manager component 642 (e.g., in a manner corresponding to cluster identification manager 112 of FIG. 1), profile analysis manager 643 (e.g., in a manner corresponding to profile analysis manager 115 in FIG. 1), cluster analysis manager component 644 (e.g., in a manner corresponding to cluster analysis manager 114 of FIG. 1), tag analysis manager 645 (e.g., in a manner corresponding to tag analysis manager 119 in FIG. 1), cluster filtering manager component 646 (e.g., in a manner corresponding to cluster filtering manager 117 of FIG. 1), reporting manager component 647 (e.g., in a manner corresponding to reporting manager 118 of FIG. 1), policy manager component 648 (e.g., in a manner corresponding to policy manager 116 of FIG. 1), and (optionally) other programs and components 649. The profile analysis manager 643 tracks the metadata associated with each sender. Such profile analysis and metadata tracking may include total volumes sent, ratios for each different type of message sent (including spam) as part of the overall volume sent, the ratio of messages sent to messages received for each MSISDN receiving messages from each sending message device identifier, etc. The tag analysis manager 645 provides the final determination for a message based on an algorithmic output derived from the cluster analysis manager 344 and the profile analysis manager 643.

It will be appreciated that server computing system 600 and the other computing systems depicted within FIG. 6 are merely illustrative and are not intended to limit the scope of the present disclosure. The systems and/or devices may instead each include multiple interacting computing systems or devices, and may be connected to other devices that are not specifically illustrated, including through one or more networks such as the Internet, messaging platforms, via the Web, or via one or more private networks. More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable and other fitness tracking devices, biometric monitoring devices, digital music player devices, handheld gaming devices, PDAs, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated Message Processing System 640 may in some embodiments be distributed in various components and/or modules other than those specifically illustrated. Similarly, in some embodiments, some of the functionality of the Message Processing System 640 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the Message Processing System 640 and/or CMP client software executing on devices 660 and/or 670) and/or data structures, such as by execution of software instructions of the one or more software programs and/or by storage of such software instructions and/or data structures. Furthermore, in some embodiments, some or all of the systems and/or components may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures or by having multiple data structures consolidated into a single data structure. Similarly, in some implementations illustrated data structures may store more or less information than is described, such as when other illustrated data structures instead lack or include such information respectively, or when the amount or types of information that is stored is altered.

A computer-implemented method in accordance with techniques described herein may be summarized as including receiving, by one or more computing systems of a message processing system, configuration information from a user regarding communications intended for clients of a first messaging platform; receiving, by the one or more computing systems and from one or more second messaging platforms, information indicative of a plurality of messages originating from computing devices associated with the one or more second messaging platforms, each message having one or more message characteristics and an intended destination computing device that is associated with the first messaging platform; analyzing, by the one or more computing systems and for each of the plurality of messages, the one or more message characteristics; identifying, by the one or more computing systems and based at least in part on the analyzing, one or more sets of multiple messages from the plurality of messages; for each of the identified one or more sets of multiple messages, determining, by the one or more computing systems and based at least in part on the configuration information from the user, one or more message categories associated with the identified set of multiple messages; and providing, by the one or more computing systems, at least one of the identified one or more sets of multiple messages to the user for handling in accordance with the one or more determined message categories, wherein providing the at least one identified set of multiple messages includes providing an indication to the user of the one or more determined message categories for the at least one identified set of multiple messages. Receiving the plurality of messages may include receiving at least some of the received plurality of messages via one or more computing systems of a distinct messaging transport platform, and forwarding the at least one identified set of multiple messages to the first messaging platform via the distinct messaging transport platform.

A computer-implemented method in accordance with techniques described herein may be summarized as including receiving, by one or more computing systems of a message processing system, configuration information from a user regarding messages intended for clients of a first messaging platform; receiving, by the one or more computing systems, information indicative of a plurality of messages from one or more second messaging platforms, each message having one or more message characteristics and an intended destination associated with the first messaging platform; identifying, by the one or more computing systems and based at least in part on analysis of the one or more message characteristics, one or more sets of messages from the plurality of messages; for each of the identified one or more sets of messages, determining, by the one or more computing systems, one or more message categories associated with the identified set of messages; and handling, by the one or more computing systems, at least one of the identified one or more sets of messages in accordance with the one or more determined message categories, wherein handling the at least one identified set of messages includes providing the at least one identified set of messages to the first messaging platform with an indication of the one or more determined message categories for the at least one identified set of messages. Determining the one or more message categories associated with the at least one identified set of messages may include modifying each message of the at least one identified set of messages to include an identifier indicative of at least one of the associated message categories, and providing the at least one identified set of messages to the first messaging platform may include providing the modified messages of the at least one identified set. Modifying each message of the at least one identified set may include modifying metadata of each message of the identified set to include the identifier. The configuration information received from the first carrier may specify the identifier indicative of the at least one associated message category.

The computer-implemented method may further include taking, by the one or more computing systems, one or more additional actions with respect to the at least one identified set of message based at least in part on the associated one or more message categories determined for the at least one identified set. Taking the one or more additional actions with respect to the at least one identified set of message may include delaying delivery of the at least one identified set of message to the first messaging platform. Identifying the one or more sets of messages from the plurality of messages may include identifying multiple sets of messages, wherein taking the one or more additional actions with respect to the at least one identified set of messages may include assigning a respective delivery priority level to each of the multiple identified sets. Taking the one or more additional actions with respect to the at least one identified set of messages may include taking at least one additional action indicated by the configuration information received from the user for communications having one of the associated one or more message categories determined for the at least one identified set of messages. The received information from the one or more second messaging platforms may include an indication of a first message category assigned to at least some of the plurality of messages by one of the one or more second messaging platforms, and determining the one or more message categories associated with the at least one identified set of messages may include identifying a corresponding message category for use with the first messaging platform. The analyzing of the at least one message characteristic of each of the plurality of messages may include applying a hash function to at least some of the plurality of messages, and comparing results of applying the hash function to the at least some messages. The analyzing of the at least one message characteristic of each of the plurality of messages may include analyzing one or more of a group that includes contents of the message; a message type associated with the message; a sender of the message; a recipient of the message; a length of the message; a volume of messages directed to or from one or more clients associated with the message; a volume of message directed to or from one or more clients associated with similar or identical messages; and metadata associated with the message. Determining the one or more message categories associated with the at least one identified set of messages may include determining that the at least one identified set of messages includes a first category of spam.

Identifying the one or more sets of messages from the plurality of messages may include identifying multiple sets of messages, wherein determining one or more message categories associated with another identified set of messages of the multiple sets of messages may include determining that the other identified set of messages includes a distinct second category of spam, and wherein the method may further include taking a first action with respect to the at least one identified set of messages based at least in part on the determining that the at least one identified set of messages includes the first category of spam, and taking a distinct second action with respect to the other identified set of messages based at least in part on the determining that the other identified set of messages includes the distinct second category of spam. The determining that the at least one identified set of messages may include the first category of spam based at least in part on one or more of a group that may include a volume of messages sent by one or more identified senders in a period of time; a ratio of a quantity of messages sent by one or more identified senders to a quantity of messages received by the one or more identified senders; one or more keywords within contents of the messages; a comparison with one or more known spam messages; a degree of similarity between messages sent by multiple distinct senders; and a degree of similarity between messages intended for multiple recipients. Determining the one or more message categories associated with the at least one identified set of messages may include determining that the at least one identified set of messages includes programmatic messages associated with one or more network-accessible services.

A non-transitory computer-readable medium in accordance with techniques described herein may include stored contents that, when executed by one or more computing systems, may cause the one or more computing systems to receive configuration information from a user; to receive information indicative of a plurality of messages from one or more first messaging platforms, each message having one or more message characteristics and an intended destination associated with carrier second messaging platform; to identify, based at least in part on analyzing the one or more message characteristics, one or more sets of messages from the plurality of messages; to determine, for each of the identified one or more sets of messages, one or more message categories associated with the identified set of messages; and to provide information indicative of at least one of the identified one or more sets of messages to the user, including the one or more determined message categories. To provide the at least one identified set of communications to the first carrier may include modifying, at least one message of the at least one identified set of communications to include an identifier indicative of at least one of the associated message categories determined for the at least one identified set of messages and to provide the at least one identified set of message to the second messaging platform for handling in accordance with the one or more determined message categories.

The stored contents may further cause the one or more computing systems to take one or more additional actions with respect to the at least one identified set of messages based at least in part on the associated one or more message categories determined for the at least one identified set, and the one or more additional actions include at least one action indicated by the configuration information received from the first carrier for messages having one of the associated one or more message categories.

The received information from the one or more first messaging platforms may include an indication of a first message category assigned to at least some of the plurality of messages by one of the one or more first messaging platforms, and the stored contents may further cause the one or more computing systems to identify a corresponding message category for use with the second messaging platform. Identifying the one or more sets of messages from the plurality of messages may include identifying multiple sets of messages, wherein the at least one identified set of messages is a first identified set of messages, wherein determining the one or more message categories associated with the first identified set of messages includes determining that the first identified set of messages includes a first category of spam, and wherein determining one or more message categories associated with a distinct second identified set of messages includes determining that the distinct second identified set of messages includes a distinct second category of spam.

Determining the one or more message categories associated with the at least one identified set of messages may include determining that the at least one identified set of messages includes programmatic messages associated with one or more network-accessible services.

A system in accordance with techniques described herein may be summarized as including one or more processors; and at least one memory, the memory including instructions that, upon execution by at least one of the one or more processors, cause the system to receive configuration information from a user regarding communications intended for clients of a first messaging platform; receive information indicative of a plurality of messages from one or more second messaging platforms, each message having one or more message characteristics and an intended destination associated with the first messaging platform; identify, based at least in part on analyzing the one or more message characteristics, one or more sets of messages from the plurality of messages; determine, for each of the identified one or more sets of messages, one or more message categories associated with the identified set of messages; and handling at least one of the identified one or more sets of messages in accordance with the one or more determined message categories.

The instructions may further cause the system to take at least one additional action indicated by the configuration information received from the user for messages having one of the associated one or more message categories determined for the at least one identified set of messages.

The received information from the one or more second messaging platforms may include an indication of a first message category assigned to at least some of the plurality of messages by one of the one or more second messaging platforms, and the instructions may further cause the system to identify a corresponding message category for use with the first messaging platform.

A computer-implemented method may be summarized as including: receiving, by one or more computing systems of a message processing system, an indication of multiple defined categories to use for identifying messages intended for destinations within a specified messaging platform; receiving, by the one or more computing systems, information indicative of multiple messages that each have one or more message characteristics and an intended destination within the specified messaging platform; analyzing, by the one or more computing systems, the one or more message characteristics for each of the multiple messages; identifying, by the one or more computing systems and based at least in part on the analyzing of the one or more message characteristics, one or more message clusters of messages from the multiple messages; for each of the one or more identified message clusters, determining, by the one or more computing systems, one or more of the defined categories to associate with the identified message cluster; and forwarding, by the one or more computing systems, at least one of the one or more identified message clusters to the specified messaging platform for handling in accordance with the determined one or more defined categories.

Receiving the indication of multiple defined categories to use may include receiving configuration information regarding the specified messaging platform, the configuration information specifying at least one of the indicated multiple defined categories. The configuration information regarding the specified messaging platform may include an indication of one or more subscriber agreements associated with the specified messaging platform, and wherein the method may further include validating, by the one or more computing systems, at least one of the one or more identified message clusters to determine whether messages of the at least one identified message cluster are in accordance with at least one of the indicated subscriber agreements. Receiving the indication of multiple defined categories to use may include receiving a plurality of messages that have been previously identified as being associated with at least some of the multiple defined categories, and wherein the analyzing of the one or more message characteristics for each of the multiple messages may include determining a degree of similarity between first message characteristics associated with messages of the at least one identified message cluster and second message characteristics associated with one or more of the plurality of previously identified messages. Determining a degree of similarity between the first message characteristics and the second message characteristics may include performing, by the one or more computing systems, one or more of a group that includes natural language processing of the multiple messages, heuristic analysis of the multiple messages, and Bayesian analysis of the multiple messages.

The computer-implemented method may further include, after the forwarding of the at least one identified message cluster to the specified messaging platform, providing, by the one or more computing systems and via a user interface of the message processing system, information regarding the one or more identified message clusters.

Providing the information regarding the one or more identified message clusters may include providing data analytics generated by the message processing system, the generated data analytics including information regarding one or more of: contents of an identified message cluster; a defined category associated with an identified message cluster; a message type associated with an identified message cluster; one or more senders associated with an identified message cluster; one or more recipients associated with an identified message cluster; a volume of messages directed to or sent from one or more users associated with an identified message cluster; a volume of messages directed to or sent from one or more users associated with one or more similar identified message clusters; and metadata associated with an identified message cluster. Providing the information regarding the one or more identified message clusters via a user interface of the carrier message processing system may include providing the information via a graphical user interface. Providing the information regarding the one or more identified message clusters via a user interface of the carrier message processing system may include providing the information via a programmatic user interface.

The computer-implemented method may further include, after the providing of the information regarding the one or more identified message clusters via the user interface, modifying the determined one or more defined categories associated with one of the one or more identified message clusters based on one or more user interactions with the user interface.

The analyzing of the one or more message characteristics for each of the multiple messages may be performed in real time as the information indicative of the multiple messages is received.

A non-transitory computer-readable medium may be summarized as having stored contents that, when executed by one or more computing systems of a message processing system, cause the one or more computing systems to: receive information indicative of multiple messages that each have one or more message characteristics and an intended destination within a specified messaging platform; analyze the one or more message characteristics for each of the multiple messages to identify one or more message clusters of messages selected from the multiple messages; for each of the one or more identified message clusters, determine one or more of multiple defined categories associated with the specified messaging platform to apply to the identified message cluster; and forward at least one of the one or more identified message clusters to the specified messaging platform for handling in accordance with the determined one or more defined categories.

The stored contents may further cause the one or more computing systems to receive configuration information for the specified messaging platform, and wherein the configuration information may specify at least one of the multiple defined categories. The configuration information regarding the specified messaging platform may include an indication of one or more subscriber agreements associated with the specified messaging platform, and wherein the stored contents may further cause the one or more computing systems to validate at least one of the one or more identified message clusters by at least determining whether messages of the at least one identified message cluster are in accordance with at least one of the indicated subscriber agreements. The stored contents may further cause the one or more computing systems to receive a plurality of messages that have been previously identified as being associated with at least some of the multiple defined categories, and wherein to analyze the one or more message characteristics for each of the multiple messages may include to determine a degree of similarity between first message characteristics associated with messages of the at least one identified message cluster and second message characteristics associated with one or more of the plurality of previously identified messages. To determine a degree of similarity between the first message characteristics and the second message characteristics may include to perform, by the one or more computing systems, one or more of a group that includes natural language processing of the multiple messages, heuristic analysis of the multiple messages, and Bayesian analysis of the multiple messages. The stored contents may further cause the one or more computing systems to, after the forwarding of the at least one identified message cluster to the specified messaging platform, provide information regarding the one or more identified message clusters via a user interface to a user. The stored contents may further cause the one or more computing systems to, after the providing of the information regarding the at least one identified message cluster via the user interface, modify the determined one or more defined categories applied to the at least one identified message cluster based on one or more user interactions with the user interface.

A messaging platform message processing system may be summarized as including: one or more processors; and at least one memory, the memory including instructions that, upon execution by at least one of the one or more processors, cause the system to: receive information indicative of multiple messages that each have one or more message characteristics and an intended destination within a specified messaging platform; analyze the one or more message characteristics for each of the multiple messages to identify one or more message clusters of messages selected from the multiple messages; for each of the one or more identified message clusters, determine one or more of multiple defined categories associated with the specified messaging platform to apply to the identified message cluster; and present information of at least one of the one or more identified message clusters to a user.

The instructions may further cause the system to receive configuration information for the specified messaging platform, and wherein the configuration information may specify at least one of the multiple defined categories. To analyze the one or more message characteristics for each of the multiple messages may include to determine a degree of similarity between first message characteristics associated with messages of the at least one identified message cluster and second message characteristics associated with one or more of a plurality of messages that have been previously identified as being associated with at least some of the multiple defined categories. The system may further include at least one user interface, and wherein the instructions may further cause the system to provide information regarding the one or more identified message clusters via the at least one user interface. The instructions may further cause the system to, after the providing of the information regarding the at least one identified message cluster via the user interface, modify the determined one or more defined categories applied to the at least one identified message cluster based on one or more user interactions with the user interface.

From the foregoing it will be appreciated that, although specific embodiments have been described herein for purposes of illustration, various modifications may be made without deviating from the spirit and scope of the present disclosure. Accordingly, the present disclosure is not limited except as by corresponding claims and the elements recited by those claims. In addition, while certain aspects of the present disclosure may be presented in certain claim forms at certain times, the inventors contemplate the various aspects of the present disclosure in any available claim form. For example, while only some aspects of the present disclosure may be recited as being embodied in a computer-readable medium at particular times, other aspects may likewise be so embodied.

U.S. Provisional Patent Application No. 62/590,917, filed Nov. 27, 2017, to which the present application claims priority, is hereby incorporated herein by reference in its entirety.

What is claimed is:

1. A computer-implemented method comprising:
receiving, by a message processing system positioned relative to a plurality of originating messaging platforms and a plurality of destination messaging platforms, separate configuration information for each of the plurality of originating messaging platforms, wherein the separate configuration information for a corresponding originating messaging platform of the plurality of originating messaging platforms includes a messaging platform identifier for the corresponding originating messaging platform and defines processing requirements for messages received from the corresponding originating messaging platform;
receiving, by the message processing system, a plurality of messages from the plurality of originating messaging platforms, wherein each corresponding message of the plurality of messages includes an originating message device identifier indicating a originating device of the corresponding message that is separate from the plurality of originating messaging platforms and includes a destination message device identifier indicating a destination device for the corresponding message that is separate from the plurality of destination messaging platforms;
for each corresponding message of the plurality of messages:
identifying, by the message processing system using the messaging platform identifiers, the corresponding originating messaging platform from which the corresponding message was received;
for each identified corresponding originating messaging platform:
selecting, by the message processing system, the separate configuration information for the identified corresponding originating messaging platform;
analyzing, by the message processing system, each message received from the identified corresponding originating messaging platform with respect to the selected separate configuration information;
grouping the messages received from the identified corresponding originating messaging platform into a plurality of message sets for the identified corresponding originating messaging platform based on the analysis of each message received from the identified corresponding originating messaging platform and the selected separate configuration information for the identified corresponding originating messaging platform;
selecting, by the message processing system, a message category for each of the plurality of message sets for the identified corresponding originating messaging platform based on the identified separate configuration information for the identified corresponding originating messaging platform; and
modifying, by the message processing system, the message category of at least one message set of the plurality of message sets for the identified corresponding originating messaging platform based on one or more user interactions with the at least one message set; and
performing, by the message processing system, an action on each of the plurality of messages based on the message category or the modified message category of the message set in which each message is grouped.

2. The computer-implemented method of claim 1, further comprising:
prior to modifying the message category of at least one message set of the plurality of message sets for the identified corresponding originating messaging platform:
providing, by the message processing system, information regarding the message category of the at least one message set and the messaging platform identifier for the identified corresponding originating messaging platform to the user; and
receiving, by the message processing system, the one or more user interactions with the at least one message set from the user.

3. The computer-implemented method of claim 1, wherein the grouping of the messages received from the identified corresponding originating messaging platform comprises:
analyzing, by the message processing system, one or more characteristics, including the originating message device identifier, of the messages received from the identified corresponding originating messaging platform; and
clustering, by the message processing system, the messages into the plurality of message sets for the identified corresponding originating messaging platform based on similarities of the one or more characteristics of the messages.

4. The computer-implemented method of claim 1, wherein the grouping of the messages received from the identified corresponding originating messaging platform comprises:
analyzing, by the message processing system, content of each message; and
clustering, by the message processing system, the messages into the plurality of message sets for the identified corresponding originating messaging platform based on similarities in the content of each message.

5. The computer-implemented method of claim 1, wherein receiving the separate configuration information for each of the plurality of originating messaging platforms further comprises:
receiving, by the message processing system, configuration information from the user defining a plurality of message categories.

6. The computer-implemented method of claim 1, wherein selecting the message category for each of the plurality of message sets for the identified corresponding originating messaging platform comprises:
dynamically creating, by the message processing system, the message category for a particular message set of the plurality of message sets for the identified corresponding originating messaging platform based on at least one message characteristic being similar among messages in the particular message set.

7. The computer-implemented method of claim 1, wherein modifying the message category of at least one message set of the plurality of message sets for the identified corresponding originating messaging platform comprises:

modifying, by the message processing system, the message category of the at least one message set for the identified corresponding originating messaging platform based on configuration information received from the user.

8. The computer-implemented method of claim 1, wherein modifying the message category of at least one message set of the plurality of message sets for the identified corresponding originating messaging platform comprises:
    modifying, by the message processing system, a risk rating for the at least one message set.

9. The computer-implemented method of claim 1, wherein modifying the message category of at least one message set of the plurality of message sets for the identified corresponding originating messaging platform comprises:
    modifying, by the message processing system, a handling instruction for messages received from the identified corresponding originating messaging platform and grouped in the at least one message set.

10. The computer-implemented method of claim 1, wherein modifying the message category of at least one message set of the plurality of message sets for the identified corresponding originating messaging platform comprises:
    modifying, by the message processing system, a handling instruction for messages received from the identified corresponding originating messaging platform that share a message characteristic with messages received from the identified corresponding originating messaging platform and grouped in the at least one message set.

11. The computer-implemented method of claim 1, wherein modifying the message category of at least one message set of the plurality of message sets for the identified corresponding originating messaging platform comprises:
    modifying, by the message processing system, a handling instruction for messages received from the identified corresponding originating messaging platform that have content a degree of similarity with content of messages received from the identified corresponding originating messaging platform and grouped in the at least one message set.

12. The computer-implemented method of claim 1, wherein selecting the message category for each of the plurality of message sets for the identified corresponding originating messaging platform comprises:
    selecting, by the message processing system, a message category of spam for at least one of the plurality of message sets for the identified corresponding originating messaging platform.

13. The computer-implemented method of claim 1, wherein selecting the message category for each of the plurality of message sets for the identified corresponding originating messaging platform comprises:
    selecting, by the message processing system, a message category of untrusted messages for at least one of the plurality of message sets for the identified corresponding originating messaging platform.

14. A system, comprising:
    one or more processors; and
    at least one memory configured to store computer instructions that, when executed by the one or more processors, cause the system to:
        receive separate configuration information for each of a plurality of originating messaging platforms, wherein the separate configuration information for a corresponding originating messaging platform of the plurality of originating messaging platforms defines processing requirements for messages received from the corresponding originating messaging platform;
        receive a plurality of messages from the plurality of originating messaging platforms, wherein each corresponding message of the plurality of messages includes an originating message device identifier indicating a originating device of the corresponding message that is separate from the plurality of originating messaging platforms and includes a destination message device identifier indicating a destination device for the corresponding message that is separate from a plurality of destination messaging platforms;
        for each corresponding message of the plurality of messages:
            identify the corresponding originating messaging platform from which the corresponding message was received;
        for each identified corresponding originating messaging platform:
            select the separate configuration information for the identified corresponding originating messaging platform;
            analyze each message received from the identified corresponding originating messaging platform with respect to the selected separate configuration information;
            cluster the messages received from the identified corresponding originating messaging platform into a plurality of message sets for the identified corresponding originating messaging platform based on the analysis of at least metadata of each message received from the identified corresponding originating messaging platform and the identified separate configuration information for the identified corresponding originating messaging platform;
            define a message category for each of the plurality of message sets for the each message received from the identified corresponding originating messaging platform; and
            modify the message category of at least one message set of the plurality of message sets for the each message received from the identified corresponding originating messaging platform based on one or more user interactions with the at least one message set; and
        perform an action on each of the plurality of messages based on the message category or the modified message category of the message set in which each message is clustered.

15. The system of claim 14, wherein execution of the computer instructions by the one or more processors to cluster the messages received from the identified corresponding originating messaging platform further cause the system to:
    analyze one or more characteristics of the messages received from the identified corresponding originating messaging platform; and
    cluster the messages into the plurality of message sets for the identified corresponding originating messaging platform based on similarities of the one or more characteristics of the messages.

16. The system of claim 14, wherein execution of the computer instructions by the one or more processors to cluster the messages received from the identified corresponding originating messaging platform further cause the system to:
    analyze content of the messages received from the identified corresponding originating messaging platform; and
    cluster the messages into the plurality of message sets for the identified corresponding originating messaging platform based on similarities in the content of the messages.

17. The system of claim 14, wherein execution of the computer instructions by the one or more processors to define the message category for each of the plurality of message sets for the identified corresponding originating messaging platform further cause the system to:
    dynamically define the message category for a particular message set of the plurality of message sets for the identified corresponding originating messaging platform based on at least one message characteristic being similar among messages in the particular message set.

18. The system of claim 14, wherein execution of the computer instructions by the one or more processors to modify the message category of at least one message set of the plurality of message sets for the identified corresponding originating messaging platform further cause the system to:
    modify a handling instruction for messages received from the identified corresponding originating messaging platform that share a message characteristic with messages received from the identified corresponding originating messaging platform and included in the at least one message set.

19. The system of claim 14, wherein execution of the computer instructions by the one or more processors to modify the message category of at least one message set of the plurality of message sets for the identified corresponding originating messaging platform further cause the system to:
    modify a handling instruction for messages received from the identified corresponding originating messaging platform that have content a degree of similarity with content of messages received from the identified corresponding originating messaging platform and included in the at least one message set.

\* \* \* \* \*